United States Patent [19]

Barber

[11] Patent Number: 5,090,429
[45] Date of Patent: Feb. 25, 1992

[54] VEHICLE WASH APPARATUS

[75] Inventor: Ivan J. Barber, Mississauga, Canada

[73] Assignee: Transcontinental Car Wash Systems Limited, Mississauga, Canada

[21] Appl. No.: 430,211

[22] Filed: Nov. 1, 1989

[30] Foreign Application Priority Data

Sep. 8, 1989 [CA] Canada ................... 610763

[51] Int. Cl.$^5$ ............................. B08B 3/02
[52] U.S. Cl. ............................. 134/57 R; 134/58 R; 134/123; 134/181
[58] Field of Search ............... 134/57 R, 45, 123, 181, 134/56 R, 58 R; 239/750, 751

[56] References Cited

U.S. PATENT DOCUMENTS

| | | | |
|---|---|---|---|
| 3,038,481 | 6/1962 | Brechtel | 134/123 X |
| 3,196,888 | 7/1965 | Rousseau | 134/45 |
| 3,349,783 | 10/1967 | Ellis | 134/45 |
| 3,421,169 | 1/1969 | Hergonson | 134/45 X |
| 3,570,502 | 3/1971 | Farnsworth et al. | 134/123 X |
| 3,996,948 | 12/1976 | Wiley | 134/45 |
| 4,718,439 | 1/1988 | Gorra et al. | 134/123 X |
| 4,719,932 | 1/1988 | Burton | 134/123 |
| 4,798,217 | 1/1989 | Hanna | 134/123 |
| 4,850,379 | 7/1989 | Petit | 15/DIG. 2 |
| 4,865,058 | 9/1989 | Crotts et al. | 132/45 |
| 4,920,997 | 5/1990 | Vetta et al. | 134/123 X |
| 4,933,016 | 6/1990 | Cralson | 134/181 X |
| 4,971,084 | 11/1990 | Smith et al. | 134/123 |

FOREIGN PATENT DOCUMENTS 2164498 7/1973 Fed. Rep. of Germany ...... 134/123

Primary Examiner—Frankie L. Stinson
Attorney, Agent, or Firm—Rogers, Bereskin & Parr

[57] ABSTRACT

A vehicle wash system includes apparatus for washing side and rear surfaces of a vehicle and apparatus for washing the front and upper surfaces of a vehicle. The apparatus for washing the side and rear surfaces includes a side and rear follower mounted on a support frame to the side of a vehicle path and moveable from a first position to the side of the vehicle path to a second position inwardly of the side of the vehicle path, nozzles being mounted on the end of the follower. With the follower in the first position, the nozzles are directed towards the vehicle path and thus towards a side surface of a vehicle, and when the follower is moving between the first and second positions, the nozzles are directed along the vehicle path and thus towards the rear surface of the vehicle. The apparatus for washing the front and upper surfaces of the vehicle includes a follower pivotally mounted on a support frame and having a pair of spaced side members extending from the mounting and a cross member extending between the ends of the side members and moveable between a lower first position where the cross member is positioned in the path of vehicles on the vehicle path and a raised second position in which the cross member is above the path of vehicles. Nozzles are mounted on the cross member and a plurality of spaced sensors are mounted on the cross member for detecting the presence of a vehicle. A follower actuator is activated by the sensors to retain the follower and nozzles a predetermined distance from the vehicle. A nozzle and sensor actuator mounted on the support frame is provided for activation by the sensors for orienting the nozzles to spray washing fluid towards the vehicle. Nozzle and sensor orienting linkages extend between the nozzle and sensor actuator and the nozzles and sensors for maintaining the nozzle and sensor orientation as the front and top follower pivots relative to the frame.

50 Claims, 11 Drawing Sheets

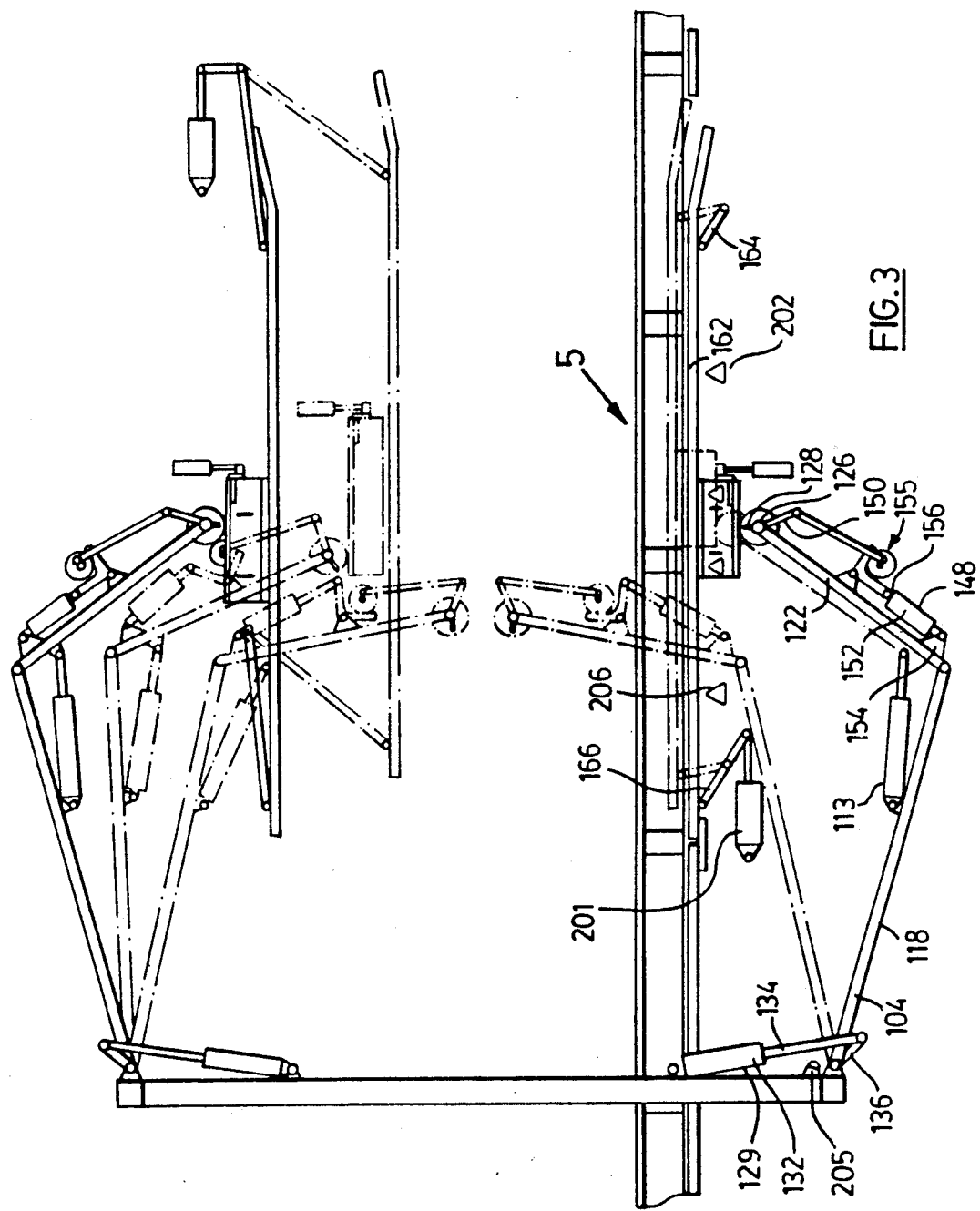

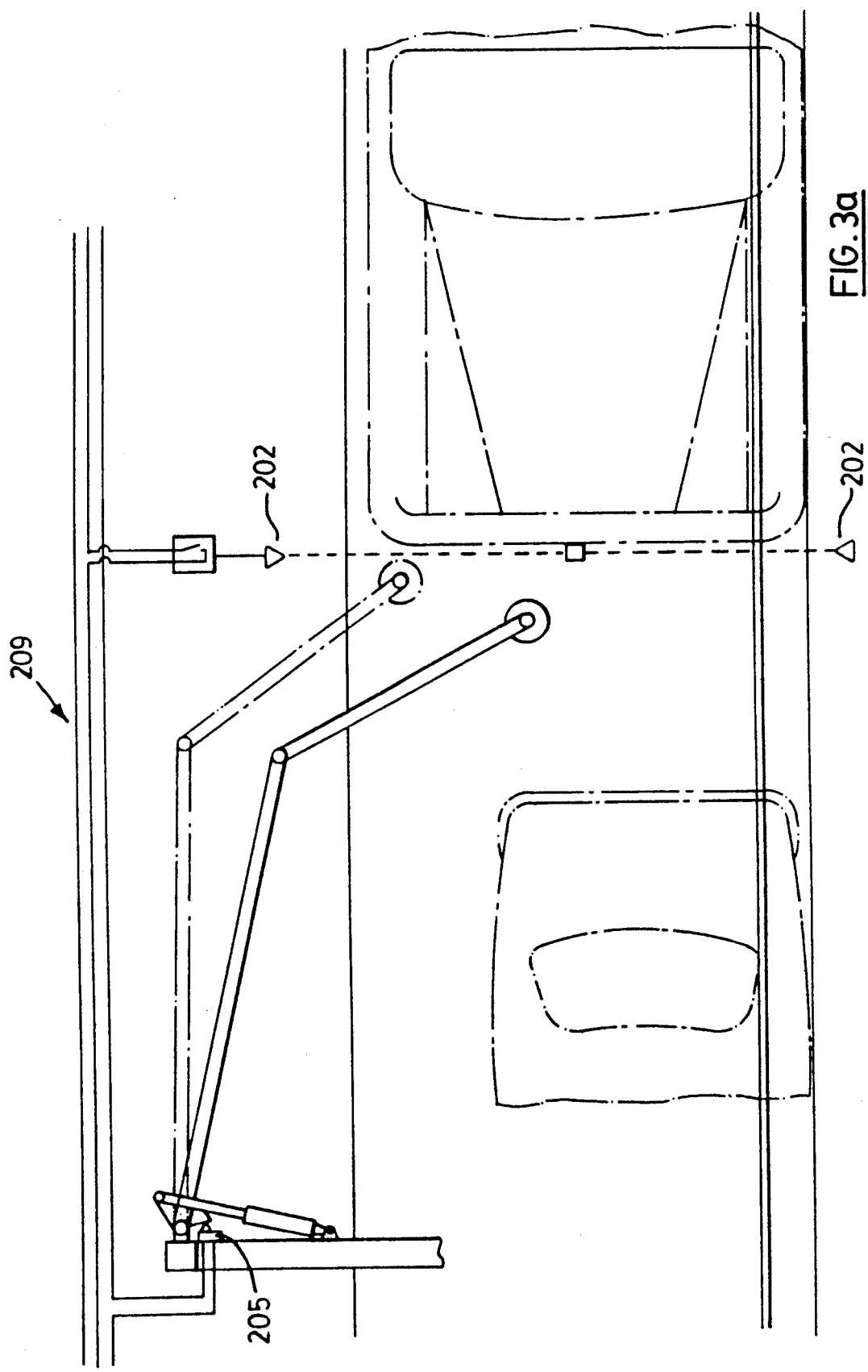

VEHICLE WASH APPARATUS

FIELD OF THE INVENTION

This invention relates to vehicle washing systems, and in particular to automatic car washing systems utilising high pressure water sprays.

BACKGROUND OF THE INVENTION

At present there are a wide variety of automatic vehicle washing systems in use. These normally include a variety of stations at which different washing operations occur: for example, a system may include a soaking station where soap is sprayed onto the vehicle, a cleaning station where brushes or a cloth curtain removes dirt from the vehicle, a rinsing station and a drying station. In certain systems a number of these stations may be provided on a single support frame which moves relative to a stationary vehicle. Such systems are known as roll over or portal washes and are generally best suited to lower volume operations. In higher volume washes the various stations are normally mounted at spaced intervals along a vehicle track. A vehicle conveyor runs along the track and is used to pull vehicles past the various stations. Such systems are known as washing lines.

The majority of automatic vehicle washing systems in use at present are of the friction type, where the removal of dirt from the vehicle is achieved by use of water and rotating brushes formed of bristle or strips of cloth, or alternatively by use of moving curtains formed of strips of cloth. Such systems are generally considered effective in removing dirt from vehicles, though there are some problems associated with such systems: loose trim, roof racks and antenna can become entangled with and damaged by the bristle or cloth; if insufficient water is supplied to the brushes or curtain, dirt may be retained on the brushes and cause damage to the finish of following vehicles; and maintenance of the brush mountings and motors can be time consuming and expensive.

More recently, vehicle wash operators have been adopting frictionless systems which go some way to avoiding the above mentioned disadvantages. In a frictionless system, the vehicle first passes through a soaking arch which sprays a dirt loosening solution onto the vehicle. The soaking arch and the next station are spaced apart sufficiently to allow the solution a predetermined soak time, before the vehicle passes through stations equipped with high pressure nozzles which direct sprays of water at the vehicle surfaces to remove the dirt which has been loosened by the solution applied at the soaking arch. The vehicle then continues past conventional rinsing drying stations.

Frictionless systems of many forms have been proposed. U.S. Pat. No. 4,711,257 (Kobayashi), U.S. Pat. No. 4,750,504 (Flaxman) and U.S. Pat. No. 4,809,720 (Hearty) disclose vehicle washing apparatus in which a vehicle remains stationary while cleaning nozzles move over the vehicle.

The Kobayashi U.S. Pat No. 4,711,257 discloses apparatus having box-shaped outer and inner hoods which are movable along rails to cover the vehicle to be washed. Mounted on rails within the covers are a plurality of inverted U-shaped pipe assemblies provided with spray nozzles through which washing liquid is sprayed as the pipes are moved along the vehicle.

The Flaxman U.S. Pat. No. 4,750,504 discloses washing apparatus in which a support frame suspends a rectangular frame having spray nozzles mounted thereon. The rectangular frame may be raised and lowered relative to the support frame, in the lower position the frame encircling a vehicle for spraying the same with water and cleaning fluid.

The Heraty U.S. Pat. No. 4,809,720 discloses apparatus in which two L-shaped rails are mounted above a vehicle washing area, vertical pipes provided with nozzles being movably mounted on the rails, each rail for washing an end and a side of the vehicle. One of the L-shaped rails is movable relative to the other such that the rectangular area defined by the rails can be altered to accomodate vehicles of different sizes.

As discussed above, and as evidenced by the disclosures of the above mentioned patents, such systems are not well adapted for use in high volume operations. It is not surprising therefore that the majority of activity in this field has been directed toward the development of frictionless systems for use in washing lines.

U.S. Pat. No. 4,739,779 to Jones et al discloses a relatively simple apparatus having a pair of U-shaped frames on which spray nozzles are mounted. The frames are spaced from one another along a vehicle track, and a timer control valve operates the nozzles at timed, predetermined intervals, thereby allowing liquid to flow from the nozzles and wash the vehicle passing through the framework.

U.S. Pat. No. 4,715,391 to Scheller also discloses a relatively simple apparatus in which a plurality of arch-like frames are spaced apart along a washing line. Each frame is formed of pipes provided with a plurality of nozzles, each nozzle having two outlets perpendicular to one another. In the disclosed embodiment three spaced arches are provided for applying sequentially to the vehicle an acidic detergent, an alkaline detergent and a rinse, as the vehicle moves through the arches. The pump apparatus associated with each arch is actuated by means of an electric eye which senses the front of the vehicle as it approaches each of the arches.

In each of the above mentioned patents, the nozzles are generally fixed at an angle perpendicular to the direction of relative motion between the washing apparatus and the vehicle and the main surfaces of the vehicle, apart from the Scheller patent in which the nozzle outlets are fixed at a 45° angle. It appears that in certain circumstances it is preferable to vary the angle of the nozzle to the car surface, and this may be achieved by providing oscillating nozzles. A number of patents disclose different approaches to providing such nozzles, including U.S. Pat. No. 4,580,726 (Unger), U.S. Pat. No. 4,679,578 (Miller), U.S. Pat. No. 4,716,916 (Hodge) and U.S. Pat. No. 4,788,993 (Beer et al).

The Unger U.S. Pat. No. 4,580,726 is not directed to automatic vehicle washing apparatus but is intended for domestic use for spray washing salt and the like from the underside of a motor vehicle. To this end the apparatus includes a hollow handle for connection to a garden hose at a first end and to upward directed spray nozzles at a second end. The spray nozzles are wheel mounted and may be steered to spray in a desired direction by twisting the handle in the direction desired.

The Miller U.S. Pat. No. 4,679,578 disclosed apparatus of various configurations provided with nozzles mounted on oscillatory header rods. The supporting frame is provided with pivoting, sliding bushings for mounting the headers to reciprocating actuators which oscillate the headers. The nozzles are formed of a short tube of resilient material with weighted ends such then when the header is oscillated, the cleaning nozzles oscillate and synchronously sweep out a controlled spray pattern.

In the Hodge U.S. Pat. No. 4,716,916 an array of nozzles are mounted on a support frame and connected to suitable drive means for oscillating the nozzles back and forth in a plane transverse to the length of the array.

In the Beer et al U.S. Pat. No. 4,788,993 a reciprocating motion is imparted to a number of nozzles mounted on spaced parallel arms linked by a straight line linkage which is parallel to and of equal length with the straight line between the pivot axis for the sets of nozzles. A motor imparts rotary movements to a crank, a line coupled to the crank causing the elongate member mounting one of the sets of nozzles, and the elongate member mounting the other set of nozzles to pivot about the respective axis and thus reciprocate the nozzles.

One of the disadvantage associated with frictionless wash systems such as those described above is the associated increase in water consumption, when compared with friction type systems. This leads to increased running costs as the purchasing, treating and heating of water represents a considerable proportion of the costs associated with a vehicle wash operation. In the systems described above, the nozzles, for the most part, remain at the same proximity to the vehicle washing path for each washing operation. This may be satisfactory for box-shaped vehicles, such as some vans, but is not as effective for, for example, narrower vehicles or cars in which the hood, and normally also the trunk, are considerably lower than the roof of the passenger compartment. To provide effective washing of a range of vehicles, apparatus of this fixed proximity type must therefore supply large volumes of cleaning water under relatively high pressures to ensure that the sprays from the nozzles impinge upon the major surface areas of most vehicles with sufficient force to dislodge dirt. This problem has been appreciated by a number of manufacturers who have proposed apparatus in which various means are provided to permit the nozzles to follow the contours of individual car shapes more closely. Apparatus of this type is disclosed in U.S. Pat. No. 4,562,848 (Messing et al), U.S. Pat. No. 4,643,209 (Fast), U.S. Pat. No. 4,718,439 (Gorra et al), U.S. Pat. No. 4,719,932 (Burton), U.S. Pat. No. 4,726,388, (Swinehart et al), U.S. Pat. No. 4,794,938 (Petit), U.S. Pat. No. 4,798,217 (Hanna) and U.S. Pat. No. 4,809,721 (Messing et al).

The Messing et al U.S. Pat. No. 4,562,848 discloses two forms of apparatus, one for cleaning the front, top and rear surfaces of a vehicle, and the other for washing the sides of the vehicle. The front, top and rear washing apparatus comprises an inverted U-shaped frame extending over a car conveyor and pivotally mounted near the ground. A cross member is suspended in the frame and supports a pipe provided with nozzles for directing cleaning fluid towards the vehicle. At the beginning of a washing operation the frame is in a starting position, swung away from the incoming car. The cross member carrying the nozzle pipe is located towards the base of the frame and the nozzles are directed towards the oncoming car. The presence of the car is detected by photocells which activate a fluid supply and a nozzle oscillating piston which provides transverse oscillation of the nozzles. As the car moves through the frame, its position continually monitored by the photocells, the cross member is moved upwardly n the frame while the cleaning fluid acts on the front of the car. The nozzles thus move over the contours of the car without touching the car surface. When the cross member and the nozzle pipe reach approximately the height of the windshield of the car, the frame begins to swing, pushed by a further piston, in the direction opposite the direction of the travel of the car through the frame. At the same time the nozzle pipe, driven by a still further piston, swings in the direction towards the surface of the car. When the frame is in an end position, swung past the vertical, opposite the direction of travel of the car, the cross member slides downwardly. Due to the inclined position of the frame and the correspondingly swung nozzle pipe, the nozzles follow the car as it moves away. When the cross member has reached its lowermost position, the frame swings into its starting position and nozzle pipe is directed toward the next arriving car.

In the side washing apparatus, nozzle pipes are provided and are swingable towards the car. The pipes oscillate in a vertical direction and the movement of these nozzle pipes towards the car is effected by swing arms and a piston. The spacing between the nozzle pipes and the car is achieved through use of sensing contact rollers.

The Fast U.S. Pat. No. 4,643,209 discloses an inverted U-shaped frame which pivotally supports a washer boom with a tilt game pivotally mounted thereon. Mounted on the tilt frame are a pair of wheels each having soft treads, and transversely disposed manifolds having a plurality of nozzles mounted on the center of the tilt frame between the wheels. As a vehicle moves through the wash, the wheels roll over the vehicle, the tilt frame and also the nozzles rotating such that the nozzles remain close to the vehicle and substantially perpendicular to the vehicle surface throughout the washing operation. Similar apparatus is also provided for cleaning the vehicle sides.

The Gorra et al U.S. Pat. No. 4,718,439 discloses a system including an overhead, pivotally mounted boom having a cross pipe provided with nozzles. Sensors are provided to lift the boom and cross pipe as a vehicle passes the station, and a timer operates to rotate the nozzle pipe from the initial position to a second position at the estimated midpoint of the vehicle.

The Burton U.S. Pat. No. 4,719,932 discloses a cantilever type boom provided with fluid dispensing nozzles and which is vertically movable on a column mounted to the side of a vehicle track. A plurality of photoelectric sensors are provided such that the boom follows the contours of a car passing under the boom. Three sets of nozzles are provided, one set for directing fluid directly towards a vehicle passing beneath the boom, a further set for directing washing fluid downwardly onto the upper surfaces of a vehicle, and a final set for directing washing fluid towards the rearwardly facing surfaces of the vehicle, the nozzles being operated sequentially as a vehicle reaches predetermined positions on the conveyor.

The Swinehart et al U.S. Pat. No. 4,726,388 discloses an inverted U-shaped spray bar support frame and a spray bar for mounting nozzles, the spray bar being vertically movably mounted in the frame. A sensing station is provided and detects the shape of a vehicle approaching the spray bar which is lifted in the frame by means of drive cables and a drawing chain in accordance with the readings obtained from the sensors and the vehicle conveyor speed. The spacing of the sensors is set and the locations of the spray bar predetermined to accomodate various forms of vehicle and to ensure that the nozzles are always maintained within a predetermined distance (12") from the vehicle surface. The sensors further control rotation of the spray bar to coincide with a vehicle shape predicted by the timing of the sensor's detection of the vehicle.

In the Petit U.S. Pat. No. 4,794,938, an inverted U-shaped frame supports a pivotally mounted boom including a rotatably mounted spray bar provided with a plurality of nozzles. Mounted on the spray bar is a sensor arrangement which follows the vehicle surface and activates actuators to lift the spray bar to allow the vehicle to pass beneath and also tilts the spray bar such that the nozzles are directed substantially perpendicularly to the vehicle surface. In one disclosed example, four sensors are provided and the spray bar is moved until two sensors are below the line of the vehicle and two are above.

The Hanna U.S. Pat. No. 4,798,217 discloses apparatus for washing the front, top and rear of a vehicle. A mounting arrangement is provided to support a cross member, the mounting being such that the orientation of the member remains constant as it is lifted to clear a vehicle passing under the apparatus. Nozzle manifolds extend through the hollow interior of the cross member and supply two sets of nozzles with washing fluids. One set of nozzles is directed towards the vehicles approaching the apparatus while the other set are inclined in the direction of motion of the vehicles. Sensors are mounted on the ends of the cross member and activate actuators to lift the cross member. The sensors also control the fluid supply to the sets of nozzle, activating one or both sets of nozzles depending on the position of the cross member relative to a vehicle.

The Messing et al U.S. Pat. No. 4,819,721 is primarily concerned with apparatus specially adapted for cleaning the side view mirror of a vehicle, but includes a vertically disposed spray nozzle tube which is mounted to permit sideways movement relative to the side of a vehicle. Positioning of a spray nozzle tube is controlled by means of sensors extending beyond the tube to detect the sides of a vehicle and to activate actuators to move the nozzle tube and maintain a substantially constant spacing between the nozzles and the vehicle side.

A related disclosure is also contained in U.S. Pat. No. 4,819,392 to Larson et al which relates to a dryer for automatic car wash equipment. The dryer includes a proximity sensing system for maintaining a forced air striping nozzle within a predetermined range of the surface of a vehicle. The sensing system includes a pair of associated triple beam photoelectric switches, each of the triple beams being adjusted to focus at a different focal point at a different distance from the nozzle. Electronic circuitry responds to signals developed by the sensing system to control actuators to maintain the nozzle within a relatively narrow range from the vehicle surface, the range being determined by the difference between the focal points of the triple beams of the two associated photoelectric switches. Stripping nozzles are provided for the top of the vehicle and also the side of the vehicle, the nozzles being mounted to a support frame through parallel link assemblies such that the orientation of the nozzles remains substantially constant throughout the range of movement.

SUMMARY OF THE INVENTION

According to one embodiment of the present invention there is provided apparatus for washing side and end surfaces of a vehicle in which there is relative movement between the apparatus and the vehicle. The apparatus comprises support means, a side and end follower mounted on the support means to the side of the vehicle path and moveable between a first position to the side of the vehicle path and a second position inwardly of the side of the vehicle path, actuating mans for moving the follower between the first and second positions, and washing fluid supply means mounted on the follower. With the follower in the first position, the washing fluid supply means are directed towards the vehicle path and thus toward a side surface of the vehicle. As the follower moves moving between the first and second positions, the washing fluid supply means are directed along the vehicle path and towards an end surface of the vehicle.

Preferably, first sensor means are provided for detecting the presence of a vehicle on the vehicle path and activating the follower actuating means to move the follower from the first position to the second position when the sensor detects that the rear corner of a vehicle on the vehicle path has passed the follower.

Preferably also, the washing fluid supply means is in the form of a plurality of nozzles and nozzle actuating means are provided for moving the nozzles between first and second positions, the nozzles being positioned in the first position when the follower is in the first position, and in the second position when the follower is moving between the first and second positions. In the first position the nozzles are directed towards the vehicle path, and the side of vehicles thereon, and in the second position the nozzles are directed in the direction of movement of a vehicle relative to the apparatus on the vehicle path, and the end of vehicles thereon.

Preferably also, the nozzles are mounted on a free end of the follower and the follower is pivotally mounted to the support frame for rotation about an upright axis substantially perpendicular to the direction of relative motion between the apparatus and the vehicle, the pivotal mounting between the support frame and the follower being spaced from the free end of the follower such that, when moving between the first and second positions, the follower may rotate to enable the nozzles to track across the rear of a vehicle as it moves forward relative to the apparatus.

Preferably also, when in the first position, the follower may be rotated relative to the support frame to vary the position of the nozzles relative to the vehicle path. Thus, the nozzles may be maintained in close proximity to the side surfaces of vehicles of different widths.

According to a further aspect of the present invention there is provided an apparatus for washing end and upper surfaces of a vehicle in which there is relative movement between the apparatus and the vehicle. The apparatus comprises support means, a front and top follower pivotally mounted on the support means and having a pair of spaced side members extending from the mounting and a cross member extending between the ends of the side members, washing fluid supply means and sensor means mounted on the cross member, follower actuating means activated by the sensor means to retain the cross member within a predetermined distance of the vehicle, washing fluid supply actuating means mounted on the support means for activation by the sensor means for arranging the supply means to spray fluid towards a vehicle, and orienting means for maintaining the supply and sensor means orientation as the follower pivots relative to the support means. The follower is movable between a lower first position for washing the front of a vehicle, the sensor means detecting the front of the vehicle as it moves on the vehicle path relative to the support means and activating the follower actuator means to lift the cross member and keep the cross member and washing fluid supply means a predetermined distance from the vehicle while the nozzles spray fluid towards the front surface of the vehicle, as the vehicle continues to move along the vehicle path the vehicle moving beneath the cross member and the washing fluid supply actuating means being activated to arrange the washing fluid supply means to supply fluid towards the upper surfaces of the vehicle, and as the vehicle moves still further along the vehicle path, the actuating means being activated to arrange the washing fluid supply means to spray fluid towards the rearwardly facing surfaces of the vehicle.

Preferably, the cross member is rotatably mounted on the spaced side members and is formed of two co-axial parts, an outer part for mounting the sensor means and an inner part rotatably mounted within the outer part for mounting the washing fluid supply means in the form of nozzles, and wherein the orienting means includes separate nozzle and sensor linkages.

Preferably also, the nozzle and sensor linkages are in the form of parallel link assemblies and the nozzle linkage includes means for oscillating the inner part of the cross member and the nozzles.

According to a still further aspect of the present invention there is provided apparatus for washing the end and upper surfaces of a vehicle in which there is relative movement between the apparatus and the vehicle including support means and an end and upper follower mounted on the support means and including a cross member extending across a vehicle path. Washing fluid supply means are mounted on the cross member and sensor means are mounted on the follower for detecting the presence of a vehicle, follower actuating means activated by the sensor means maintaining the cross member a predetermined distance from the vehicle. The washing fluid supply means are arranged to direct washing fluid towards an adjacent surface of the vehicle by washing fluid supply actuating means, activated by the sensor means. The sensor means are in the form of a plurality of sensors, a first sensor extending rearwardly of the cross member for detecting forwardly directed surfaces of vehicles, a second sensor extending downwardly of the cross member for detecting upwardly directed surfaces of vehicles, and a third sensor extending forwardly of the cross member from detecting rearwardly facing surfaces of vehicles. The sensor means activate the washing fluid actuating means to direct the nozzles in line with the sensor which detects an adjacent vehicle surface.

BRIEF DESCRIPTION OF THE DRAWINGS

These and other embodiments of the invention will now be described, by way of example, with reference to the accompanying drawings, in which:

FIG. 3 is a plan view showing, in larger detail, the apparatus for washing the side and end of a vehicle of FIG. 1, the apparatus for washing the end and upper surfaces being omitted from this view for clarity;

FIG. 3a is a schematic representation of a part of a safety system provided in the vehicle washing line;

DETAILED DESCRIPTION OF THE PREFERRED EMBODIMENTS

Figure 1:
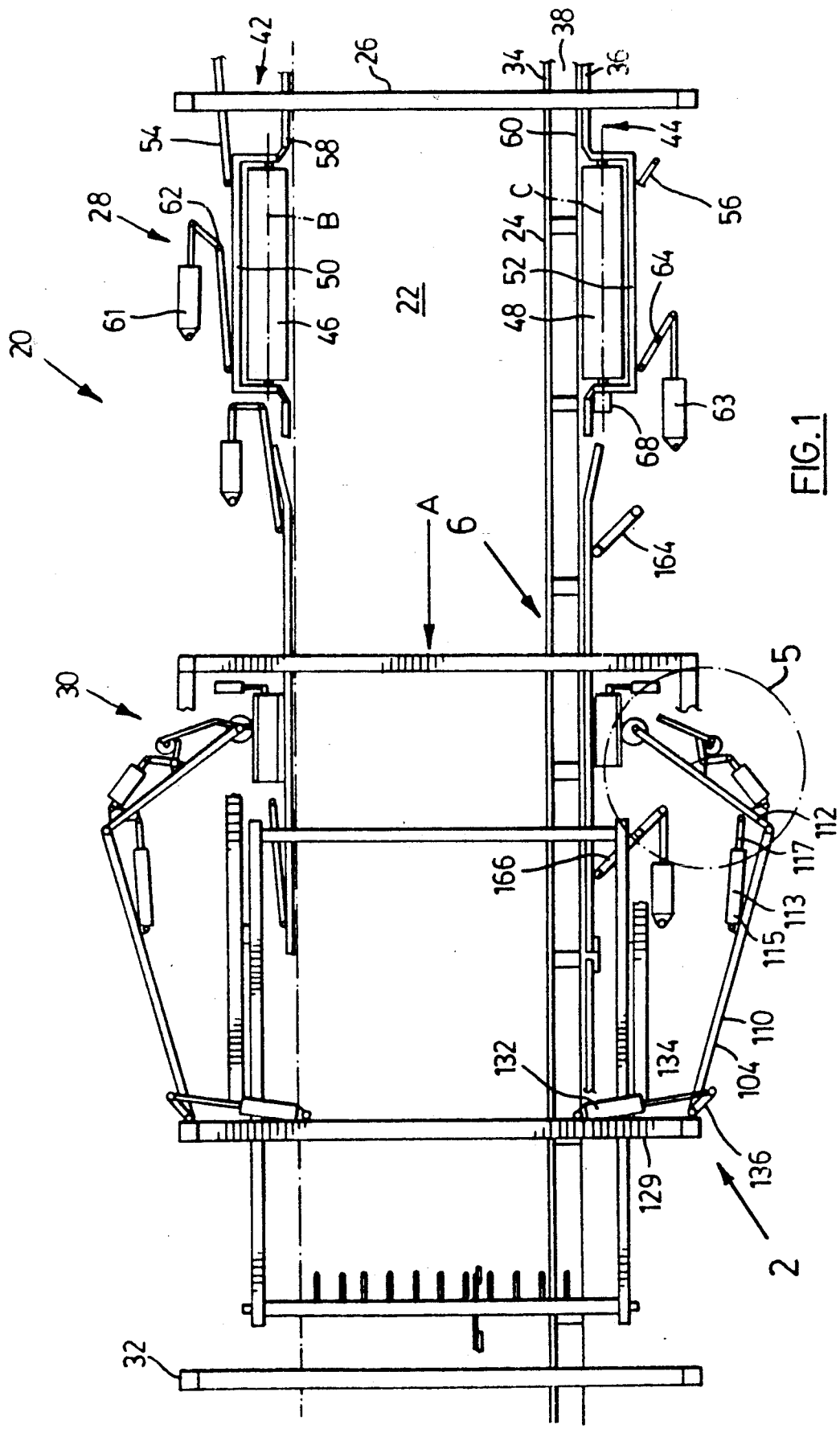
FIG. 1 is a simplified plan view of a vehicle washing line incorporating apparatus for washing side and end surfaces of a vehicle in accordance with a first preferred embodiment of the present invention and apparatus for washing end and upper surfaces of a vehicle in accordance with a second preferred embodiment of the present invention.

Reference is first made to FIG. 1 of the drawings which illustrates, in a somewhat simplified form, part of a washing line 20 for use in cleaning automobiles. The washing line 20 surrounds a vehicle track 22 along which automobiles are drawn by means of a vehicle conveyor 24. In FIG. 1, the conveyor 24 moves vehicles from right to left in the direction of arrow A, past the various stations. The first station encountered is a presoak arch 26, closely followed by a tire scrubbing station 28. The vehicles then pass through a washing station 30 provided with apparatus for washing the side and end surfaces of the vehicle and apparatus for washing the end and upper surfaces of the vehicle. The vehicle then passes through a rinsing arch 32. Following the rinsing arch there will normally be provided a drying station (not shown) for stripping water from the vehicle and possibly stations adapted for, for example, applying and polishing wax finishes or for administering rust inhibitors.

The washing station 30 forms the main focus of this invention and will be described in detail hereinafter, following a brief description of the other features of the washing line 20.

The conveyor 24 comprises two parallel rails 34, 36 which define a track 38 for receiving the left hand tires of a vehicle. A series of spaced rollers or dollies 40 for example at 6'2" spacing, are driven along the track 38 and engage the rear of the vehicle tire to pull the vehicle along the track 22 through the washing line 20.

The presoak arch 26 is in the form of an inverted U-shaped frame provided with a series of inwardly directed spray nozzles (not shown) for spraying a solution onto the external surfaces of the vehicle as it passes the station. The components of the solution are selected to loosen the dirt on the vehicle surfaces such that the dirt will be more easily dislodged and removed as a vehicle passes through the washing station 30. To avoid unnecessary waste of solution, a sensor 42 is provided to detect the vehicles upstream of the arch 32, the sensor 42 activating a suitable pump (not shown) to spray solution onto the vehicle when the front of the vehicle is detected as it passes through the arch 26, and deactivating the pump when the rear of the vehicle passes a sensor 44 located downstream of the arch. It should be noted that conventional "electric eye" sensors of the type used in vehicle wash systems are normally provided in pairs, one on either side of the track. However, for clarity, for the most part, only single sensors will be described and shown.

Following the presoak arch 26 is the tire scrubbing station 28 which comprises a pair of bristle brushes 46 and 48 located on opposite sides of the vehicle track 22. The brushes 46 and 48 are rotatably mounted in respective supporting frames 50 and 52 on axes B and C, which extend parallel to the direction of movement of vehicles on the track. The frames 50 and 52 are themselves mounted on respective pairs of parallel links 54 and 56 arranged to ensure that the brushes 46 and 48 remain parallel to the vehicle track 22. It will be noted that the links 54 for the brush 46 on the right hand side of the track (relative to the direction of movement of a vehicle on the track) are longer than those provided for the other brush 48, to accomodate the greater degree of motion required for the brush 46 to accomodate vehicles of different widths.

The position of the brushes 46 and 48 is controlled by the location of respective pipe guides 58 and 60, mounted on the frames 50 and 52, adapted to engage the lower portions of vehicles tires. The pipe guides are so called because they are formed of lengths of hollow tubing or pipes. The supporting frames 50 and 52, and the respective brushes 46 and 48 and pipe guides 58 and 60, are biased inwardly of the track by means of actuators in the form of pneumatic piston cylinder assemblies 61 and 63 which are connected between a fixed point and a crank pin 62 and 64 of the frame links 54 and 56 and tend to rotate the links to bias the scrubber assemblies inwardly of the track 22. As a vehicle moves through the tire scrubbing station 28 its tires engage the pipe guides 58 and 60, pushing the assemblies outwardly such that the brushes 46 and 48 are positioned for efficient cleaning of the vehicle tires. The brushes 46 and 48 are rotated by means of suitable hydraulic motors 68 (only one shown) and suitable spray nozzles (not shown) are provided on the frames 50 and 52 to wet the brushes 46 and 48.

Though this system is intended to minimize physical contact between cleaning apparatus and the vehicle, it is extremely difficult to adequately clean the sidewalls and wheels of a vehicle without the use of brushes, this being particularly noticable in vehicles provided with whitewall tires. However, the brushes 46 and 48 are located low enough such that the only contact is with the tires of vehicles.

The soaking arch 26 and the washing station 30 are spaced apart by a length sufficient to allow the solution applied by the arch 26 to "soak" before the vehicle enters the washing station 30. The optimum soak time is determined by the solution used, the volume and concentration of solution applied and is controlled by the conveyor speed and the station spacing.

As the vehicle passes through the washing station, high pressure, fresh water is sprayed onto the major surfaces of the vehicle, removing the solution and the dirt on the vehicle. After leaving the washing station 30, a vehicle passes through the rinsing arch 32 where any remaining solution or dirt is rinsed from the vehicle.

Figure 2:
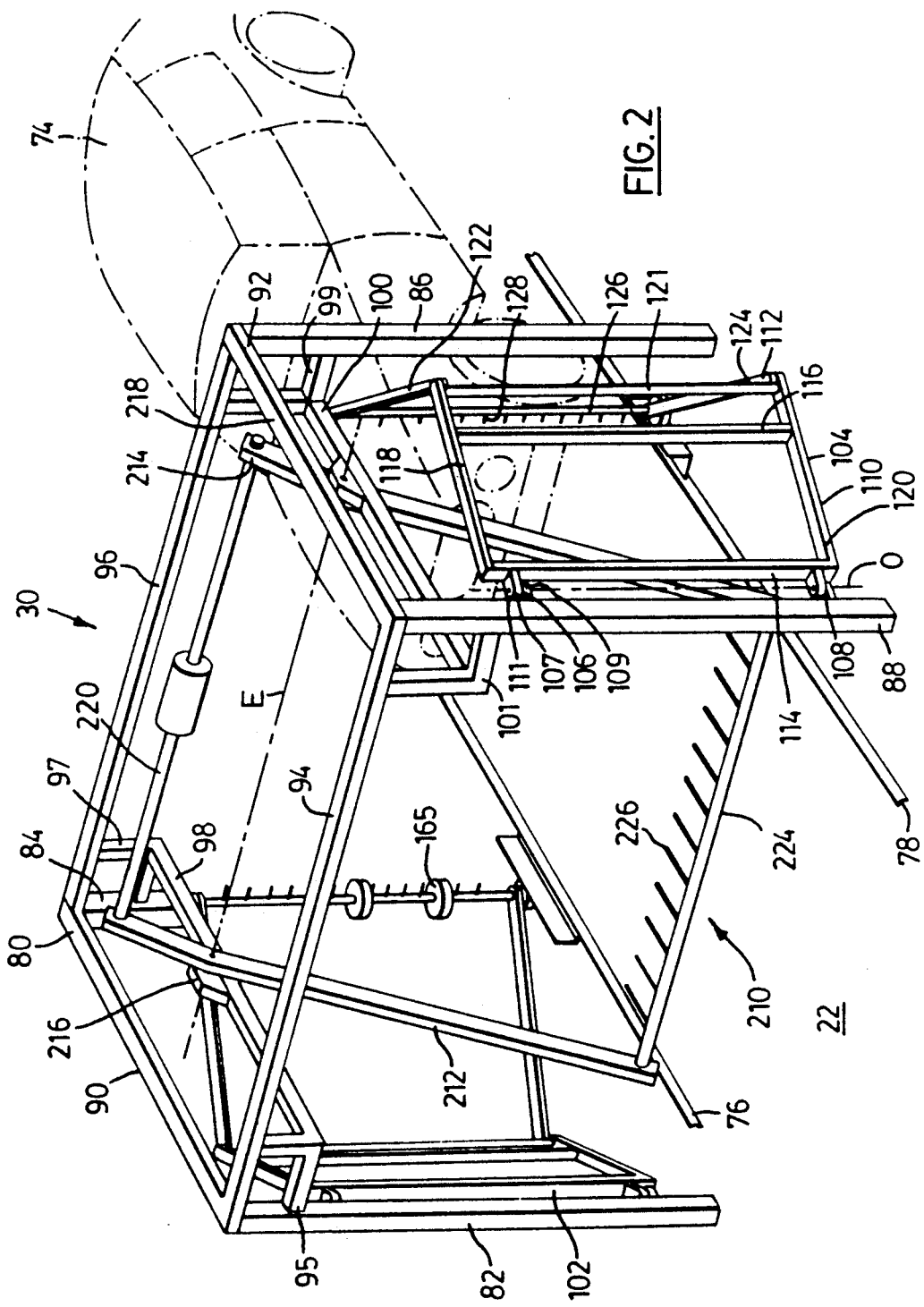
FIG. 2 is a simplified perspective view, in direction 2 of FIG. 1, of the apparatus for washing the side and end surfaces of a vehicle and the apparatus for washing the end and upper surfaces of a vehicle of FIG. 1.

The washing station 30 will now be described in more detail, and reference is first made to FIG. 1, and also to FIG. 2 of the drawings, which illustrates the mounting arrangement for the washing apparatus. FIG. 2 shows an automobile 74, in ghost outline, approaching the washing station on the vehicle track 22 between pipe guides 76 and 78, the purpose of which will be explained in due course. A support frame 80 is provided for mounting components at the station 30 and comprises four upright posts 82, 84, 86 and 88 mounted on a supporting floor, two posts being located on each side of the track. The posts on the same side of the track are jointed by respective frame members 90 and 92 which extend parallel to the track, and the pairs of posts on opposite sides of the track are connected by respective cross members 94 and 96, typically 12' apart. Further members 98 and 100 extend between the cross members 94 and 96 parallel and inwardly of the frame members 90 and 92, between right-angled frame portions 95, 97, 99 and 101 provided at the corners of the upright posts and the cross members.

The apparatus for washing the side and end surfaces of vehicles, in this case the side and rear surfaces, includes a pair of side and rear followers 102 and 104 pivotally mounted on respective upright posts 82 and 88, along opposite sides of the track. As both followers 102 and 104 are substantially similar, the following 104 will be described as being representative for both. Mounting for the follower 104 is provided by hinges 106 and 108 formed by lugs 107 and 109 on the follower 104 and post 88 and cylindrical pins 111 which extend from one of each pair of lugs through a circular aperture in the other of the pair. The hinges permit rotation of the following 104 around an upright axis D.

The follower 104 comprises two C-shaped frames or arms, a primary arm 110 and a secondary arm 112, connected to one another at an angle of approximately 115°. The connection between the arms 110 and 112 permits relative rotation therebetween, however a schock absorbing link 113 (FIG. 1) is provided between the arms 110 and 112 and normally holds the arms fixed in position relative to one another. The link 113 is in the form of a pneumatic piston and cylinder arrangement, the cylinder 116 and piston rod 117 being rotatably mounted on the respective arms 110 and 112. The cylinder 115 is connected to a constant pressure air supply (not shown) provided with a relieving type air regulator which maintains the air pressure in the cylinder at a constant level even when the arms 110 and 112 are moved closer together and the link compressed. The purpose of the link 113 will be described hereinafter.

The primary arm 110 of the follower 102 includes two upright members 114 and 116 and upper and lower horizontal members 118 and 120. The pivotal mounting between the arms 110 and 112 is provided at the end of the horizontal members 118 and 120 of the arm 110 and corresponding horizontal members 122 and 124 of the arm 112 in the form of a tube 121 fixed to the member 118 and 120 provided with stub shafts (not shown) at the ends thereof to engage respective corresponding openings in the ends of the members 118 and 120. An upright pipe 126 extends between and is rotatably mounted to the free ends of the horizontal members 122 and 124, and a plurality of nozzles 128 are provided on the pipe 126. The spray angle of the nozzles are preferably in the range of 10°–45°, the angle selection being governed by various factors including nozzle spacing on the pipe 128, spacing between the nozzles and the average vehicle surface, desired degree of overlap between nozzle sprays, and water consumption. The pipe will normally be around 80" long to accomodate cars and vans. Clearly apparatus intended for washing, for example, trucks will have longer pipes and correspondingly larger followers and support frame.

During a washing operation, the follower 104 is initially located in a first position, to the side of the vehicle track 22, to wash the side of the vehicle. After the rear corner of the vehicle passes the washing nozzles 126, the follower 104 moves towards a second position at the centre of the vehicle track. This movement is achieved by rotating the following 104 on the support frame 80, such that as the nozzles 128, which must also be rotated, track across the rear of the vehicle as the follower moves towards the second position. The various controls and mechanisms for rotation of the follower 104 and the nozzles 128 are described below.

Rotation of the follower 104 relative to the support frame is achieved by means of an actuator 129 in the form of a piston and cylinder arrangement, shown FIG. 1, and also in FIG. 3 of the drawings. The actuator 129 is pivotally mounted on end extends between the support frame 80 and the upper horizontal member 118 of the primary arm 110. The cylinder 132 is pivotally mounted to the frame 101 and the piston rod 134 pivotally connects with a crank 136 fixed to the hinge pin of the upright member 114.

Figure 4:
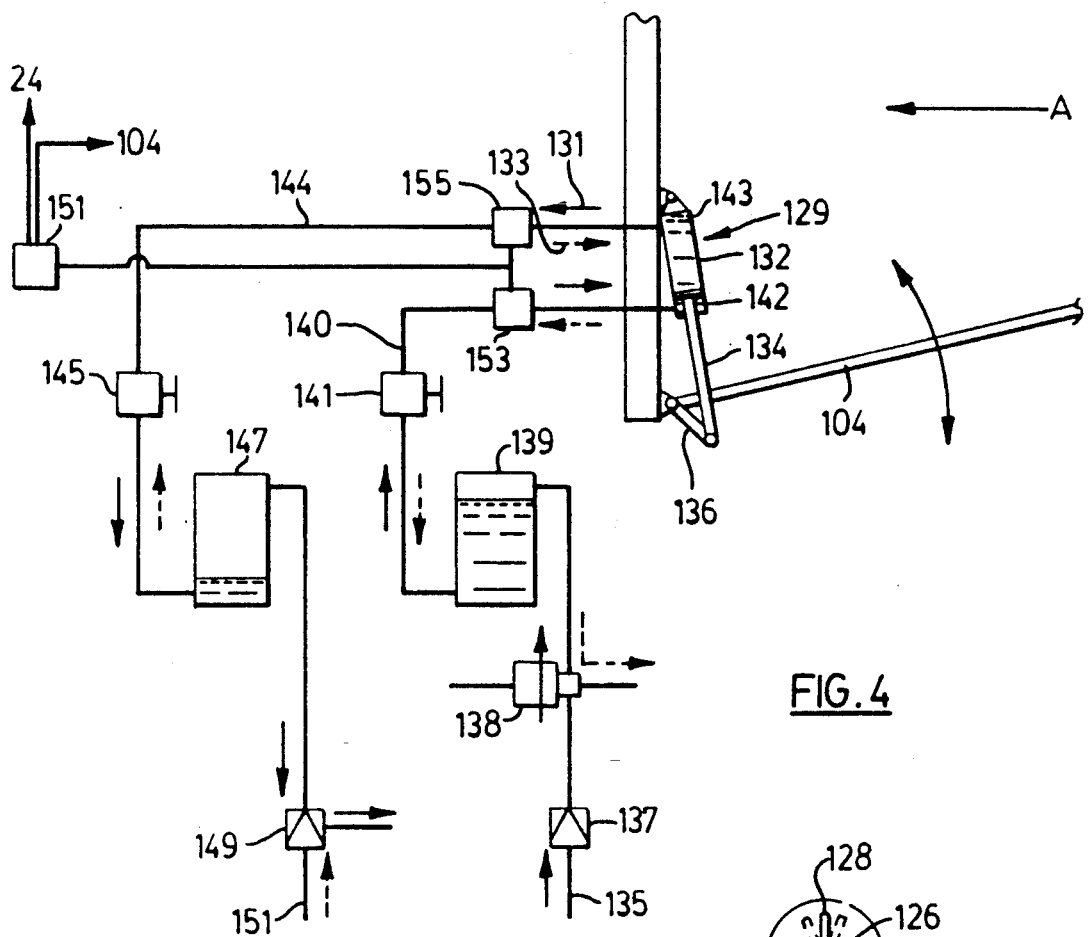
FIG. 4 is a schematic representation of a following actuator control system of the apparatus for washing the side and end surfaces of FIG. 1.

FIG. 4 of the drawings is a schematic representation of the operating controls for he actuator 129. In the drawings, the solid arrows 131 indicate the flow of operating fluid when the follower 104 is being rotated inwardly from the first position to the a second position and towards the vehicle track 22, which the broken arrows 133 indicate the flow of operating fluid when the follower 104 is rotating outwardly from the second position to the first position.

To move the follower towards the second position, relatively high pressure air, around 150 p.s.i., is supplied from a compressor (not shown) through an air line 135 and a pressure reducing valve 137 which lowers the air pressure to approximately 50 p.s.i. The air then passes through a three-way, solenoid operated valve 138 configured to permit flow into the top of an air/oil reservoir 139. The air displaces the oil from the reservoir 139 through oil lines 140 and open flow control valve 141 and into the front chamber 142 at the rod end of the cylinder 132. The oil bears against the piston, causing the piston rod 134 to retract into the cylinder and pull the follower 104 inwardly towards the vehicle track. The chamber 143 rearwardly of the piston also contains oil, and the retraction of the rod 134 displaces this oil through oil line 144, provided with a flow control valve 145. The valve 145 limits the rate at which oil may be displaced from the chamber 143 and thus controls the rate of rotation of the follower 104. Beyond the valve 145, the oil passes into the bottom on an air/oil reservoir 147 to displace air from the top of the reservoir 147 through a relieving-type regulator 149 set at approximately 25 p.s.i., to exhaust to atmosphere.

To move the follower 104 from the second position to the first position, air is supplied from the compressor through an air line 151 and regulator 149, which lowers the pressure to about 25 p.s.i. The air then passes to the reservoir 147, from which the air displaces oil through the open flow control valve 145 into the chamber 143 to the rear of the piston. The displaced oil from the other side of the piston flows through the flow control valve 141, which limits the rate of flow of oil to the reservoir 139. The air displaced from the reservoir passes through the valve 138, now configured to exhaust the displaced air to atmosphere and to isolate the 50 p.s.i. supply from valve 137.

In the event of the conveyor 24 stopping, inward movement of the follower from the first to second position must be arrested, otherwise the follower would contact the rear surface of the vehicle. To avoid this occurring a parallel control system 351 is provided and detects if the conveyor stops while the follower is between the first and second positions. In this situation, the system 351 closes solenoid valves 353 and 355 on the oil lines 140 and 144 to prevent any fluid being displaced from the cylinder, which effectively locks the follower 104 in position. When the conveyor starts moving, the valves 353 and 355 are returned to the normal open configuration.

Figure 5:
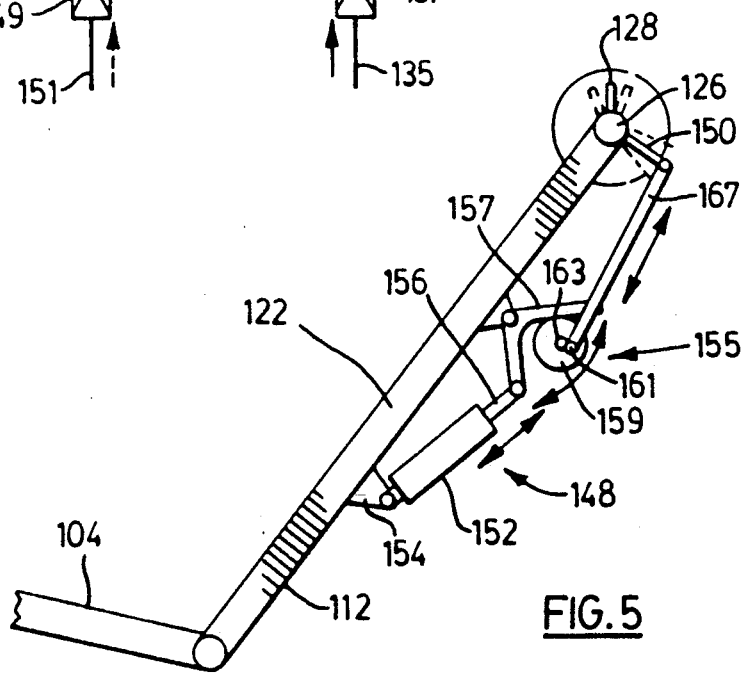
FIG. 5 is a plan view in larger detail of area 5 of FIG. 1, showing a nozzle oscillating mechanism.

Reference is now made to FIG. 5 of the drawings, which will be used to illustrate the mechanism for rotating the nozzles 128 when the follower is first moved from the first position towards the second position.

The pipe 126 at the end of the secondary arm 112 of the follower 104 is connected to a pressurized water supply (not shown) to provide a steady supply of high pressure water which passes through the nozzles 128 to wash the vehicles on the track. The pipe 126 is rotatably mounted on the members 122 and 124 (FIG. 2) through suitable bearings and movement of the pipe is achieved through use of a nozzle actuator 148 in the form of a pneumatically operated piston cylinder arrangement extending between the upper horizontal member 122 and a crank 150 fixed to the pipe 126 via nozzle oscillating means 155. The actuator cylinder 152 is pivotally mounted on a bracket 154 fixed to the member 122 and the piston rod 156 is pivotally connected to one are of a bell crank 157. The other arm of the crank serves as a mounting for a rotating motor, for example a hydraulic motor 159, and the bell crank 157 itself is pivotally mounted to the member 122. A short crank 161 extends from the drive shaft 163 of the motor and is pivotally connected to a link 167 which extends to a pivotal connection with the crank 150 fixed to the pipe 126. Running the motor 159 causes the pipe 126 and thus the nozzles 128 to oscillate and provide a wider spray pattern.

In alternative embodiments an oscillating motor may be utilised, or, if oscillation is not considered necessary, the oscillating means 155 could be omitted to allow a direct link between the piston rod and the crank.

Figure 6:
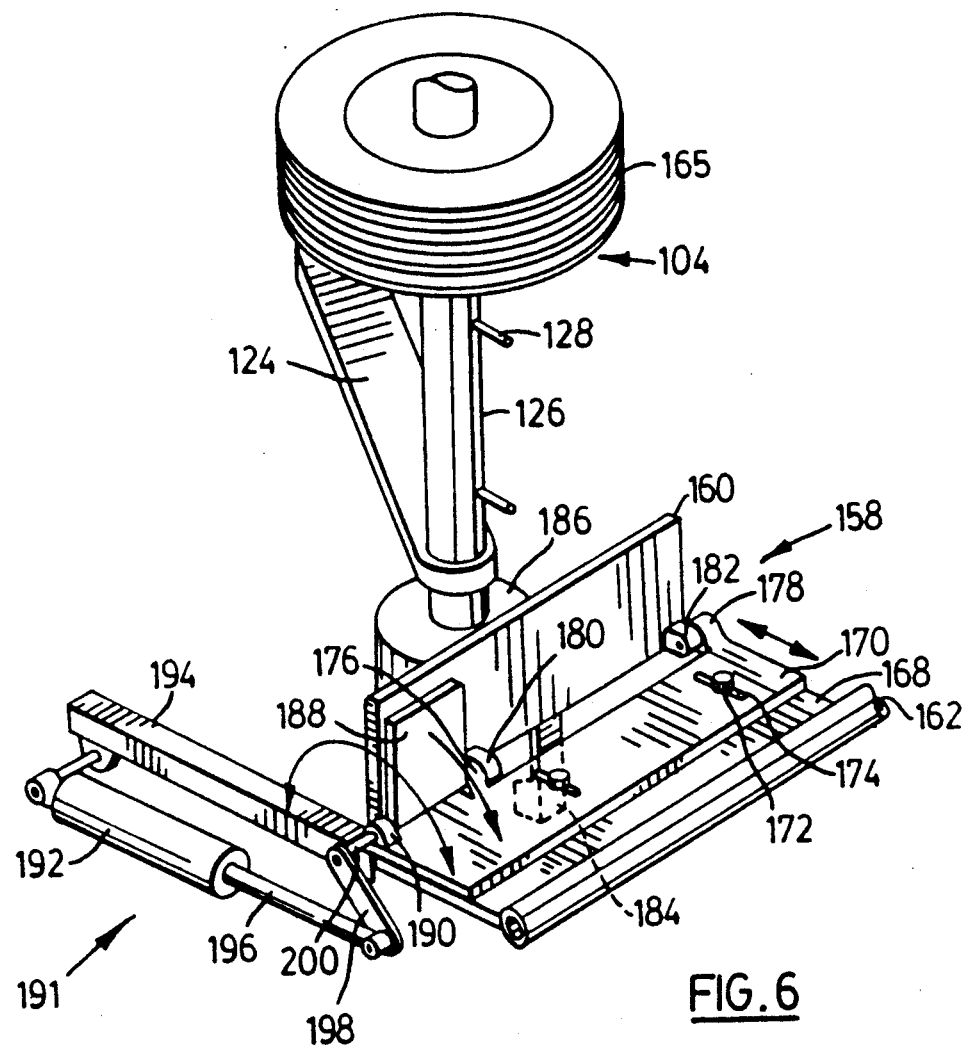
FIG. 6 is a scrap perspective view in direction 6 of FIG. 1, showing a follower release mechanism.

Mounted on the pipe 126, at spaced intervals, are soft tread wheels 165 (FIG. 6) which extend beyond the nozzles 128. In the event of a failure in control of the following 104, the wheels 165 will contact the vehicle surface and hold the nozzles 128 spaced from the vehicle.

During a washing operation, the following 104 is biased by the actuator 129 to move in towards the vehicle track and thus towards the side of vehicles on the track. The follower 104 is restrained in the first position, as shown in FIG. 1, and in solid outline in FIG. 3, by first follower positioning means which also position the follower relative to the side of a vehicle. The first follower position means includes a latch means 158 which is illustrated in more detail in FIG. 6 of the drawings. The latch means 158 includes a latch member 160 rotatably mounted to a pipe guide 162 mounted to the side of the track 22 on a pair of parallel links 164 and 166 (FIGS. 1 and 3). The pipe guide 162 extends along the track from just beyond the tire scrubbing station 28 and is adapted to engage a lower sidewall portion of a vehicle tire. A rectangular horizontal plate 168 is welded to a rear face of the pipe guide 162 and a further rectangular plate 170 is secured to the upper face of the plate 168 by means of bolts 172. The plate 170 is provided with parallel elongate slots 174 for receiving the bolts, which permits a degree of adjustment between the relative positioning of the plates 168 and 170. Lugs 176, 178 are provided on the rear edge of the plate 170 and have pivot pins which pivotally engage corresponding lugs 180, 182 on the lower portion of the latch member 160, which is also in the form of a rectangular plate. The latch member 160 is pivotally attached to the plate 170, as described above, but tends to assume an upright orientation due to the provision of a counterweight 184 extending from the base of the plate. In the configuration shown in FIG. 6, a small diameter (approximately 3") wheel 186, provided on the lower end of the pipe 126 or the member 124, bears against the rear face of the latch member 160, which is prevented from pivoting forward by a lock member 188 in the form of a smaller square plate. The lock member 188 is pivotally mounted to the plate 170 on pivot pins extending through lug 180 and a lug 190. Positioning of the lock member 188 is achieved by means of a lock actuator 191 in the form of a pneumatically actuated piston and cylinder arrangement. The cylinder 192 is pivotally attached to a member 194 extending rearwardly from the plate 168 and the piston rod 196 is pivotally connected to a crank 198, the opposite end of which is fixed to a cylindrical rod 200 which extends through the lug 190 to the base of the lock member 188.

Prior to a washing operation the follower 104 is located to the side of the vehicle track 22. An actuator 201 (FIG. 3) for controlling the location of the pipe guide 162, in the form of a biasing means, typically a spring, is configured to hold the pipe guide 162 back from the track in the position indicated in solid line in FIG. 3, until an electric eye sensor 202 located adjacent the uptrack end of the pipe guide 162, detects the front of a vehicle. The actuator 129 is then activated to bias the follower 104 and the pipe guide 162 towards the vehicle track overcoming the actuator 201, and position the pipe guide 162 against a front tire of the vehicle. The front tire of the vehicle thus control the positioning of the pipe guide 162, and thus also the guide means and the follower 104. The location of the plate 170 on the plate 168 is set such that the relative positioning between the pipe guide 162 and tire will result in the nozzle 128 being positioned approximately 8" from the side surface of the average vehicle. The actuator 129 remains activated until the vehicle passes a sensor 206, downtrack of the follower second position.

In some systems, no actuator 201 may be provided, the pipe guide 162 tending to occupy a position inwardly of the side of the vehicle track at all times. This reduces the complexity of the system but increases the risk that vehicles will ride over the pipe guide 162, particularly on the side of the track opposite the vehicle conveyor, where the degree of travel of the pipe guide must be greater to accomodate different widths of vehicles.

As the vehicle passes the sensor 202, the washing fluid supply to the nozzles and the nozzle oscillating means are activated and water is sprayed onto the side surface of the vehicle, in a spray pattern governed by the nozzle configuration and the oscillating speed and range, dislodging dirt and the solution applied at the presoak arch. This continues until the rear of the vehicle clears the sensor 204. At this point, the latch means 158 is operated: the actuator 191 is activated to move the lock member 188 to a retracted position, where the member 188 lies on the plate 170, allowing the follower 104, under the influence of the actuator 129, to push the latch member 160 over and thus allowing the follower 104 to swing inwardly towards the vehicle track. As was mentioned above, inward rotation of the follower is controlled by the actuator 129 and the flow control valve 145 which, as described above, limits movement of the piston in the cylinder 132 when the piston is being retracted. The restrictor is selected such that the follower 104 will rotate at a speed such that the nozzles 128 track along the rear surface of a vehicle, at a distance of approximately 8" from the surface, as it is moved through the station 30, at a constant speed, by the conveyor.

The operators may wish to operate the vehicle wash at different capacities, depending on demand, and to do this the conveyor speed is slowed to lower capacity, or increased to provide greater capacity. Such a change in speed must be carried out in conjunction with an adjustment of at least flow control valves 145, such that the nozzles will track across the rear of vehicles in conjunction with the forward movement of the vehicle.

At the same time as the lock member 188 is retracted, the nozzle actuator 148 is activated to rotate the nozzle pipe 126, and thus also the nozzles 128, through approximately 90° such that the nozzles 128 are pointing down the track 22, towards the rear surface of the vehicle. Thus, as the follower 104 rotates, the nozzles 128 are directing water towards the rear surface of the vehicle until the following 104 reaches the second position at the centre of the track 22, as shown in ghost outline in FIG. 3 of the drawings, approximately 36" downtrack from the first position.

Thus, the side and rear surfaces of the vehicle are cleaned, the guide means and the tracking of the follower across the rear of the vehicle ensuring that the nozzles are kept in relatively close proximity to the vehicle surfaces to provide effective washing with minimum water consumption.

As the vehicle progresses along the track, the end of the vehicle will clear the sensor 206 which activates the actuator 129 to return the follower 104 to the first position. Alternatively, a proximity switch 205 (FIG. 3) on the frame 80 may trigger the actuator to retract the follower 104. As the follower is swung back from the vehicle track 22 across the latch means, the wheel 186 engages the inner face of the latch member 160. As the member 160 is not restrained from pivoting to a second retracted position outwardly of the plate 170, the follower pushes the latch member 160 over and passes over the member. After the follower has passed, the latch member 160, under the influence of the counterweight, returns to its extended or upright position. The follower 104 rotates a short distance past the latch member and remains in this position until the sensor 202 detects a following vehicle and activates the actuator 129 to bias the follower 104 inwardly towards the vehicle track 22 and thus to bear against the outer face of the latch member 160.

In the event of a "run-away" car being driven through the wash, the shock absorbing link 113 provided between the primary and secondary arms allow the follower 104 to "knuckle" and be pushed out of the way of the vehicle, preventing expensive damage to the vehicle and the apparatus. In fast lines it may even be preferable to retract the link at the end of each vehicle washing to permit faster rotation of the followers and closer vehicle spacing.

A further feature of the wash station 30 will now be described, with reference to FIGS. 3 and 3a of the drawings. In certain circumstances, vehicles may be positioned on the conveyor such that there is a relatively small space between the rear of a vehicle and the front of a following vehicle, such that there would be insufficient space for the followers 102 and 104 to return to the first position to wash the side of the following vehicle. To prevent this occurring, a proximity switch 205 is provided on the frame, which detects when the followers 102 and 104 are in the second position. This witch forms a part of the conveyor power supply circuit 209 and is located in parallel with a further switch 207 operated by the sensor 202. If the follower 102 is in the second position and the sensor 202 detects the front of a following vehicle at the same time, power to the conveyor is shut off, while the followers 102 and 104 are retracted to the first position. As soon as the follower 102 has reached a position in which it can pass the front of the following vehicle or the vehicle can pass it, the switch is closed and the conveyor operates again.

The apparatus for washing end and upper surfaces of vehicles, in this case the front and upper surfaces, will now be described, reference being made initially to FIG. 2 of the drawings. The apparatus comprises a follower 210 pivotally mounted on the support frame 80 for rotation around horizontal axis E which extends perpendicular to and above and across the vehicle track 22. The follower 210 includes side members 212 and 214 mounted on pivot pins which extend from blocks 116 and 118 fixed to the top of frame members 98 and 100. As seen in FIG. 2, the upper ends of the side member 212 and 214 are joined by a cross member 220 on which is mounted a counter weight 222. A cross bar 224 extends between the lower ends of the side members 212 and 214 and in the position shown the cross member 224 extends across the vehicle track 22 in the path of the oncoming vehicle 74. A plurality of nozzles 226 are mounted on the cross bar 124 and are positioned by actuators activated by sensors to direct washing fluid towards vehicles on the track. As a vehicle moves along the track 22 the follower 210 pivots to lift the cross member 224 to allow the vehicle to pass under the member 224. For clarity, the various sensors and actuators have been omitted from FIG. 2 and will be described below with reference to more detailed drawings.

Figure 7:
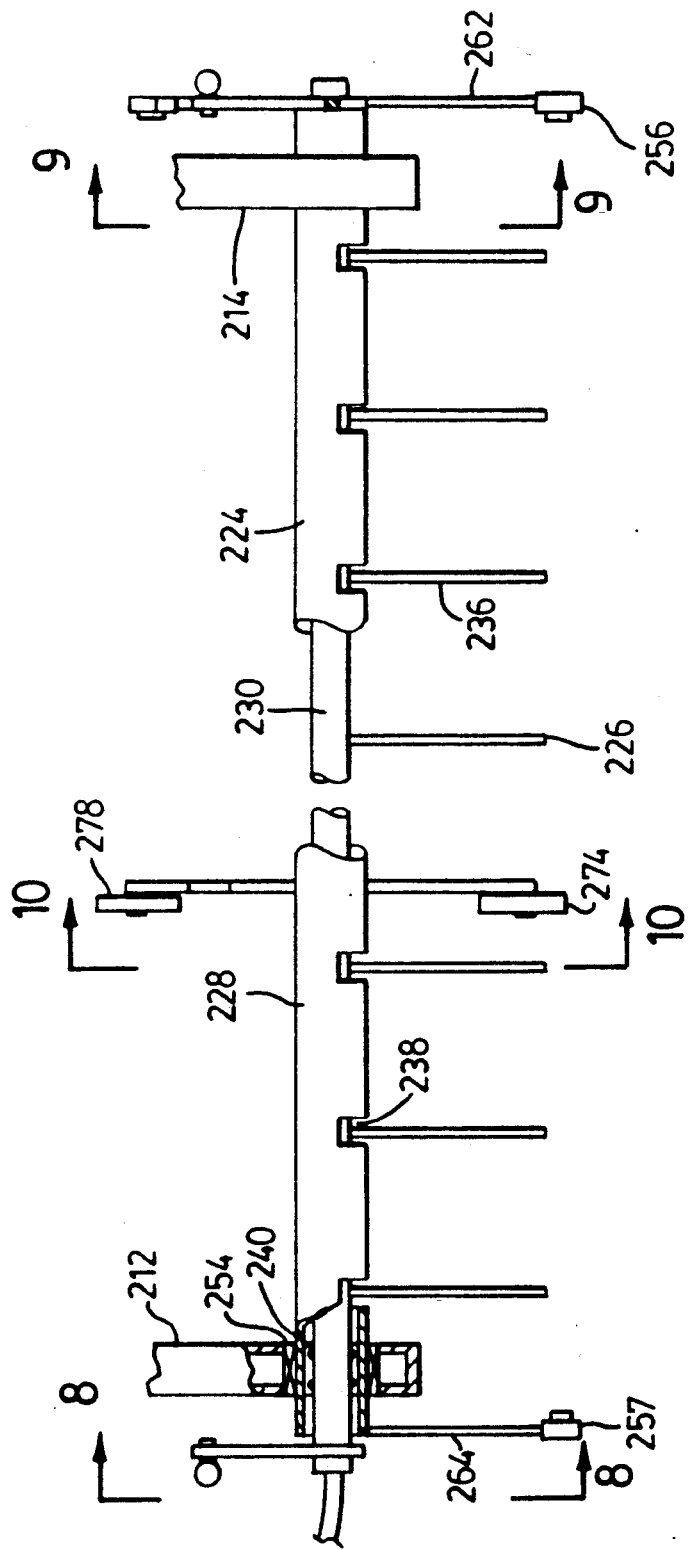
FIG. 7 is a plan view of a nozzle bar of the apparatus for washing the front and end surfaces of a vehicle of FIG. 1.
Figure 8:
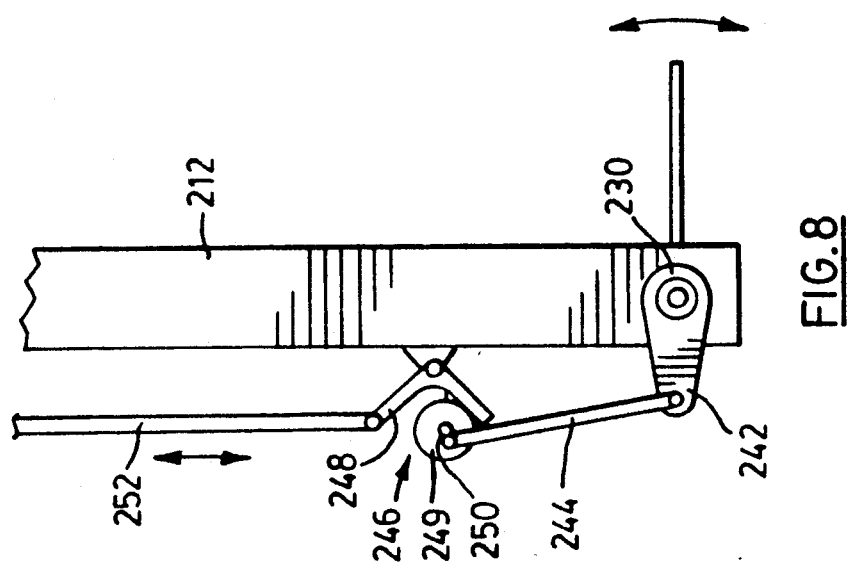
FIG. 8 is an end view of the nozzle bar taken on the line 8—8 of FIG. 7, showing the nozzle operating linkage.

FIG. 7 is an enlarged partially sectioned and cutaway view of the cross member 224 extending between the ends of the side members 212 and 214. It will be noted that the cross member 224 actually comprises two parts, an outer part or tube 228 and an inner part or tube 230. The nozzles 226 are mounted on the inner tube 230 and are provided with long nipples 236 in communication with the interior of the tube 230, to which a high pressure fluid supply is connected. The nipples 236 extend through part annular apertures 238 in the outer tube, the apertures being annular to accomodate rotation of the inner tube 230 relative to the outer tube 228. The inner tube 230 is positioned between bearings 240 within the outer tube 228 and is rotated by means of a parallel link assembly located at the left hand end of the cross member 224 (as seen in FIG. 7), a part of the linkage being shown in side view in FIG. 8 of the drawings, to which reference should now be made.

A crank 242 is fixed to the tube 230, an elongate link 224 being pivotally connected to the crank 242 and extending to a nozzle actuator, to be described in due course, via nozzle oscillating means 246. Like the nozzle oscillating means provided on the side and rear followers 102 and 104, the nozzle oscillating means 246 comprises a bell crank lever 248 pivotally mounted on the side member 212, a rotating, hydraulic motor 219 being mounted on one arm of the lever 248 and rotating a short crank 250 pivotally connected to the link 244. An elongate link 252 is pivotally connected to the other arm of the bell crank lever 248 and extends to the nozzle actuating means.

Figure 9:
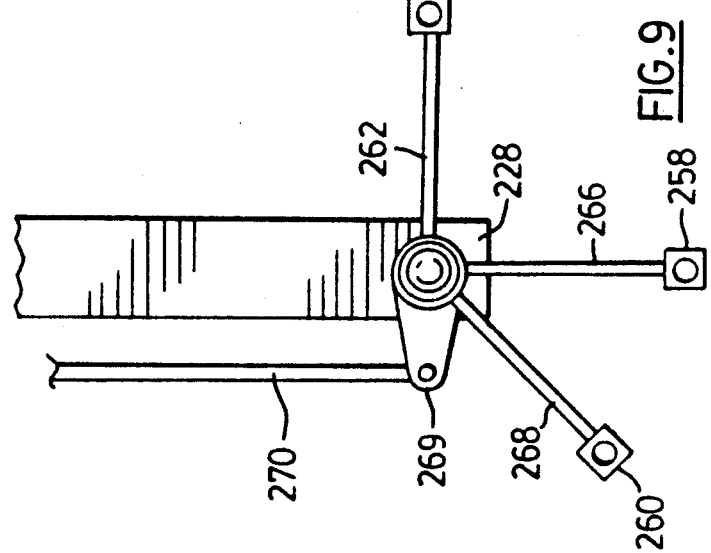
FIG. 9 is an sectional view on line 9—9 of FIG. 7, showing the sensors and safety wheel dolly operating linkage.

Referring once more to FIG. 7 of the drawings, the outer tube 228 is mounted between the ends of the side members 212 and 214 via bearings 254. Fixed to either end of the tube 228 are three sensors 256, 258 and 260 (FIG. 9) which cooperate with complimentary sensors 257 (only one shown) at the other end of the tube 228. The relative orientation of the sensors can be seen in FIG. 9 of the drawings, the first pair of sensors 256 and 257 being mounted on support members 262 and 264 extending horizontally and towards vehicles approaching the station 30, the second pair of sensors 258 being mounted on support members 266 extending vertically downwards from the tube 228, and the third pair of sensors 260 mounted on support members 268 extending downwardly and towards vehicles leaving the station 30 at an angle of approximately 45° the vertical. The orientation of the tube 228 and sensors is, like the nozzles 226, controlled by a parallel link assembly, a portion of which is visible in FIG. 9. A crank 269 is fixed to the tube 228 and extends rearwardly to a pivotal connection with an elongate link 270 which extends to the sensor actuating means.

Figure 10:
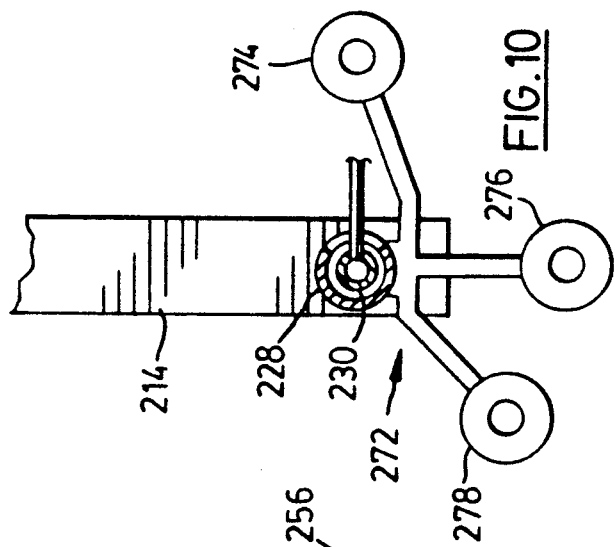
FIG. 10 is a sectional view on line 10—10 of FIG. 7, showing the safety wheel dolly (on same sheet as FIG. 7)

Also mounted on the outer tube 228 is a safety wheel dolly 272, shown in some detail in FIG. 10 of the drawings. The dolly 272 is provided with three soft three wheels 274, 276 and 278 located at similar angles to the sensors relative to the tube 228, but being located closer to the tube 228 than the sensors so as not to block the sensors, and further from the tube than the nozzles so as to prevent the nozzles contacting the vehicle surface in the event of breakdown.

Figure 11:
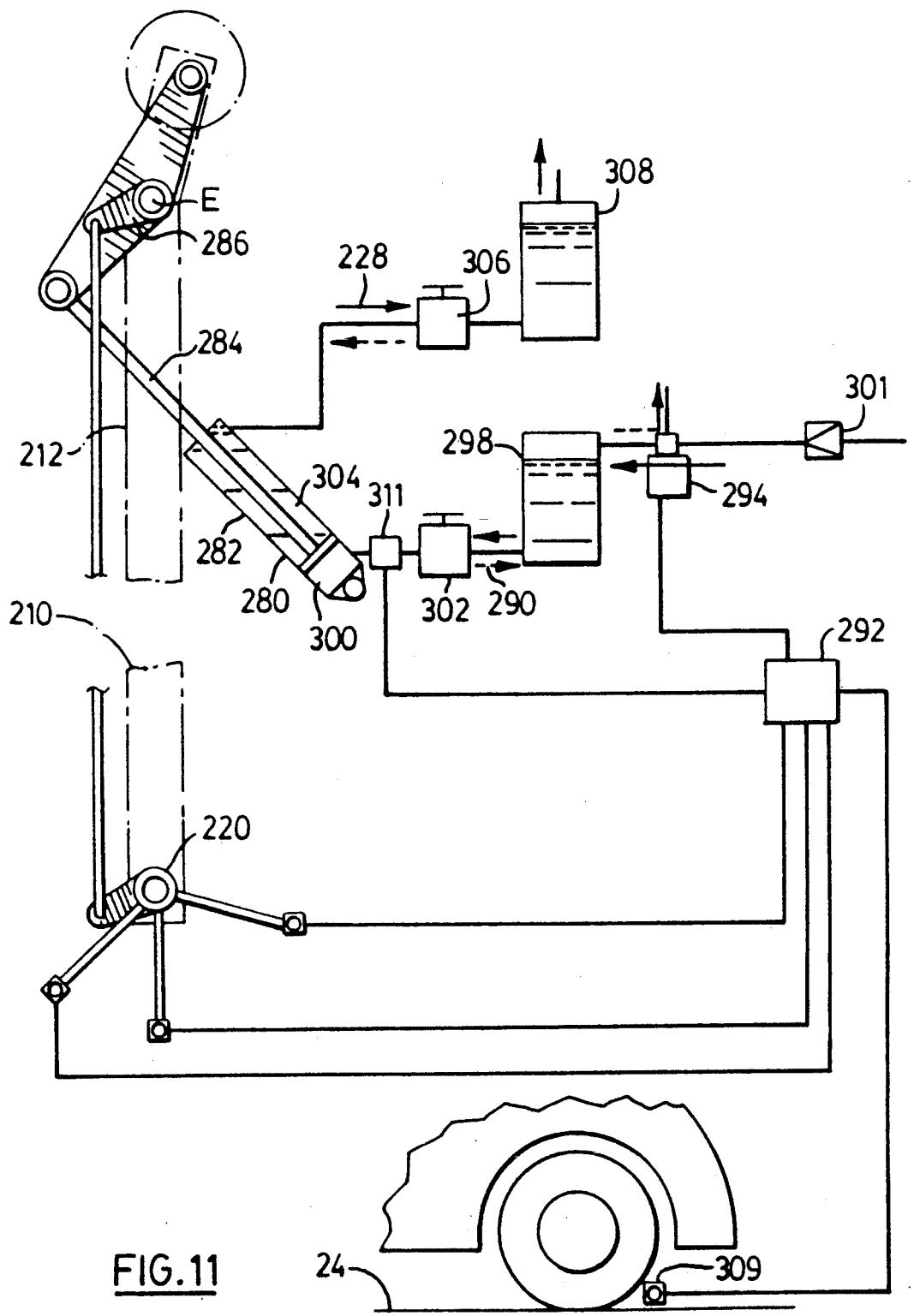
FIG. 11 is a schematic representation of an end and upper follower actuating system of the apparatus for washing the end and upper surfaces of a vehicle of FIG. 1.

Reference is now made to FIG. 11 of the drawings which illustrates, somewhat schematically, the operation of the follower actuator 280 which raises and lowers the follower 210 as a vehicle moves through the washing station 30. Actuation is provided by a piston and cylinder arrangement, the cylinder 282 being pivotally mounted to the support frame while the piston rod 284 is pivotally connected to a crank 286 fixed to the side member 212.

Initially, the follower 210 is positioned as shown in FIG. 11 with the side members 212 and 214 substantially upright, with the cross member 224 located approximately 12" above the floor surface in the path of an approaching vehicle. As the vehicle 74 nears the cross member 224 the first pair of sensors 256 and 257 detect the front of the vehicle and operate the actuator 280 to lift the cross member 224 out of the way of the vehicle. The actuator is fluid actuated, and the direction of fluid flow when the follower 210 is being lifted is indicated by the solid arrows 288, while the fluid flow when the follower 210 is being lowered is indicated in broken arrows 290. When the first pair of sensors 256 and 257 detect the vehicle, a signal is sent to an actuator control 292 which activates a three-way solenoid operated valve 294 to control the supply of fluid to the cylinder 282. When the sensors 256 and 257 detect the vehicle, the valve 294 is configured to allow air to flow and displace oil from an air/oil reservoir 298 into the lower chamber 300 formed by the cylinder 282 and piston. The air is provided by a compressor at approximately 150 p.s.i. and is passed through a pressure reducing valve 301 where the pressure falls to approximately 50 p.s.i., before being introduced into the reservoir 298. The displaced oil flows freely through a flow control valve 302 into the cylinder chamber. The flow of oil into the chamber displaces oil from the chamber 304 formed on the other side of the piston. This oil is displaced through a flow control valve 306 which limits the rate of flow of oil from the chamber 304 and thus limits the rate of movement of the follower 210. From the valve 306 the oil passes into an air/oil reservoir 308 where the oil displaces air to exhaust to atmosphere.

A similar operation occurs whenever one of the other pairs of sensors 258 and 260 detect a vehicle.

When no vehicle is detected by the sensors this is an indication that the follower 210 should be lowered. In this situation, the valve 294 is reconfigured to permit the air to flow to atmosphere from the reservoir 298. The weight of the follower 210 bears on the piston and pushes the piston down into the cylinder. The displaced oil on the other side of the piston flows through the flow control valve 302, which limits the rate of flow of oil to the reservoir 298. The air displaced from the reservoir 298 passes through the valve 294, now configured to exhaust the displaced air to atmosphere.

In the event of the conveyor 24 stopping, movement of the follower 210 must be arrested, otherwise the follower would come to rest on the surface of the vehicle. To avoid this a conveyor sensor 309 is provided which detects if the conveyor stops and closes a solenoid valve 311 if this should occur. Closing the valve isolates the lower chamber 300 of the cylinder and thus locks the follower 210 in position. When the conveyor begins moving once more, the valve 311 is returned to the open configuration.

Movement of the follower 210 is carried out in discrete increments, rather than a continuous movement, and this is achieved by scanning the sensors 256, 258 and 260 at times intervals, depending on the conveyor and the vehicle speed through the station 30. After scanning the sensors, the valve 294 is configured appropriately for a further timed interval to produce a predetermined degree of movement of the follower 210.

In the event of a "run-away" vehicle it is desirable that the follower 210 can be pushed out of the way by the vehicle, thus preventing expensive damage to the follower 210 and vehicle. In such a situation, the flow control valve 306 prevents free movement of the follower and thus the line between the cylinder and the value 306 is adapted to only withstand and oil pressure of about 150 p.s.i. before failing, and allowing the follower to be pushed out of the way. Alternatively, the control valve 306 may be omitted altogether.

As the follower 210 is moved to allow a vehicle to pass therebelow, the nozzles, sensors and safety wheels mounted on the cross member are maintained in substantially constant orientation by means of respective parallel arm systems. A nozzle linkage is provided at one end of the cross member to control the orientation of the inner tube and the nozzles, while a sensor linkage controls the orientation of the outer tube and the sensors and safety wheels. Both linkages operate similarly and therefore the nozzle linkage will be described, with reference to FIGS. 12a-e of the drawings, as exemplary of both linkages. It should be noted that, for simplicity, the nozzle oscillating means 246 has been omitted.

Figure 12A:
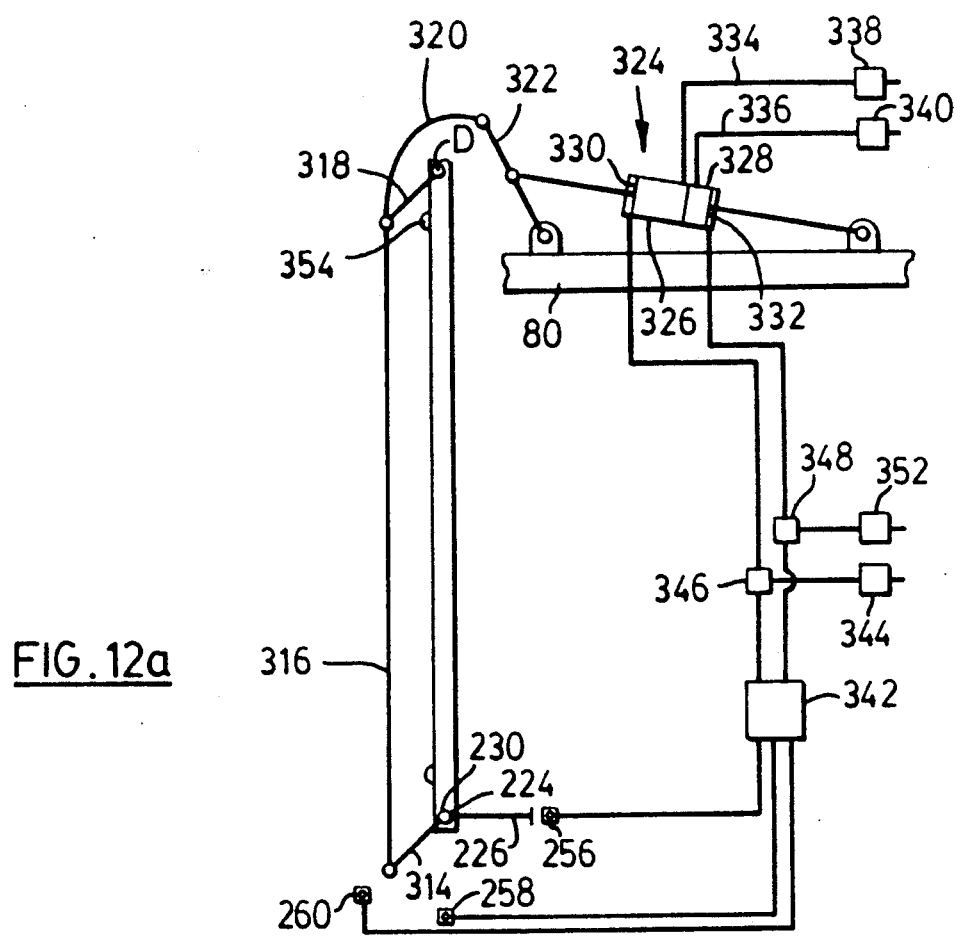
FIGS. 12a–12e are simplified side views of the relative position of the apparatus for washing the end and upper surfaces of FIG. 1, as a vehicle moves through the apparatus.
Figure 12B:
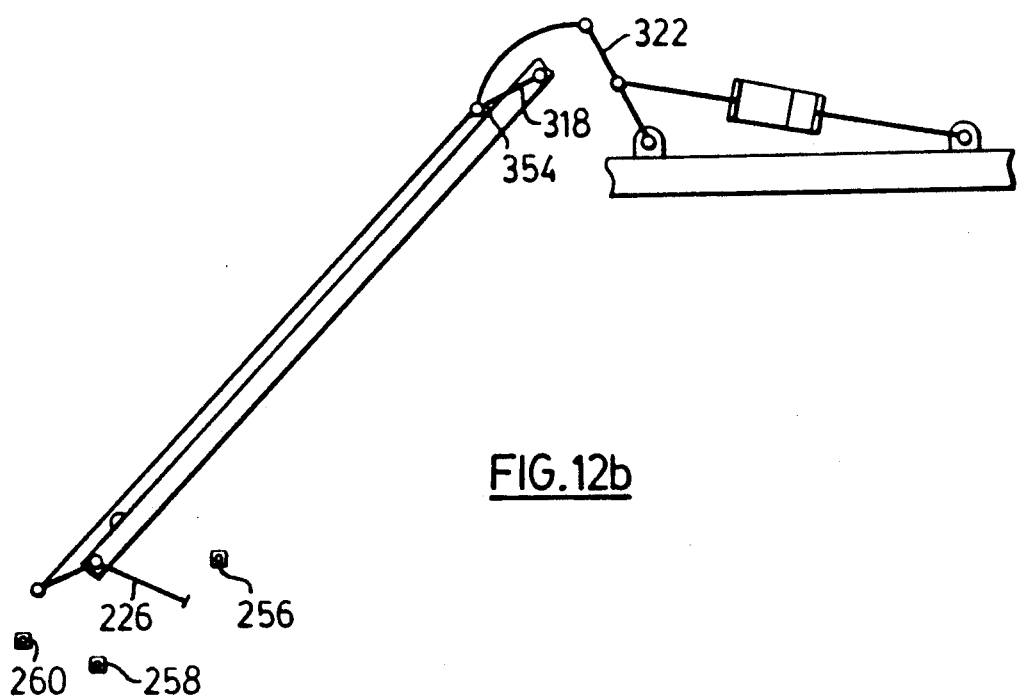
Figure 12C:
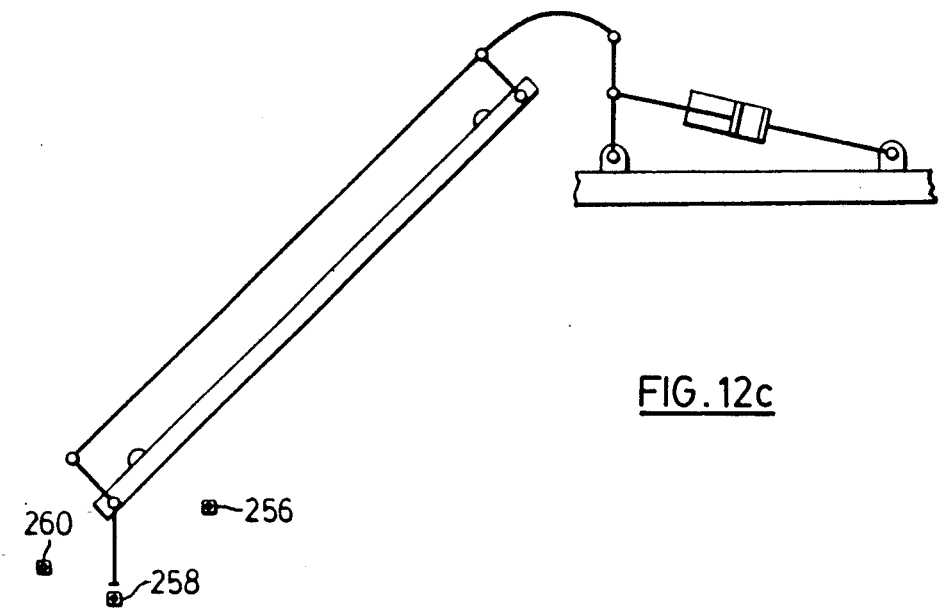

Referring first to FIG. 12a of the drawings of the follower is shown in a first position with the nozzles 226 and the cross bar 224 located in the path of a vehicle approaching the station 30 along the vehicle track 22.

Figure 12D:
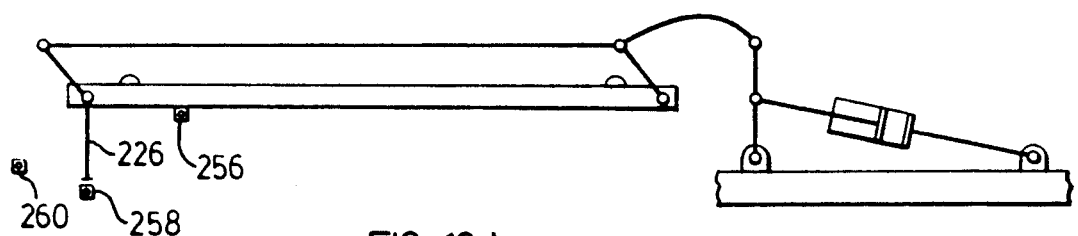
Figure 12E:
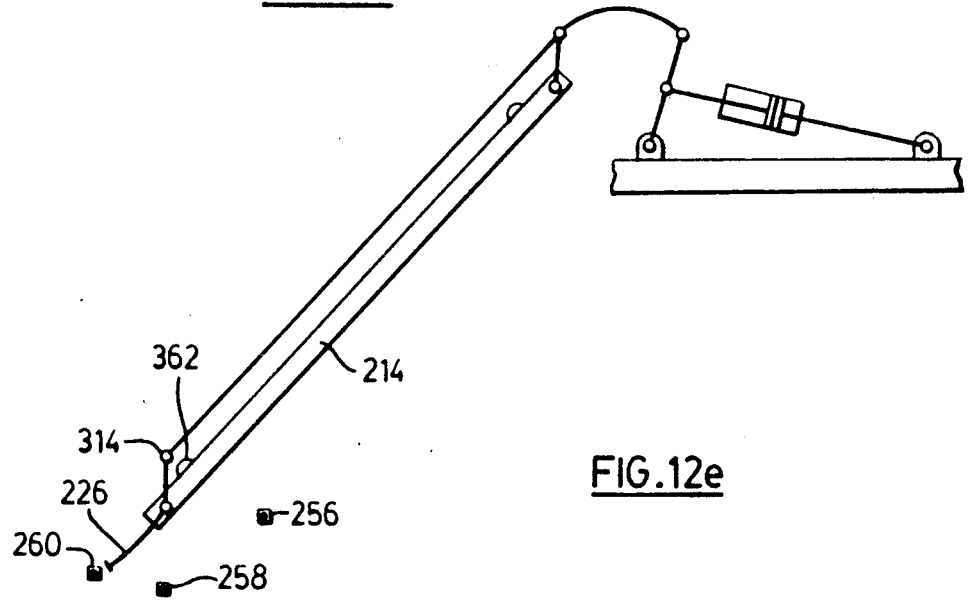

Extending forwardly (relative to vehicle direction A) and downwardly from the inner tube 230 at an angle of approximately 45° is a crank 314, pivotally parallel to the side member 212 of the follower 210. At its upper end, the link 316 is pivotally connected to a locating link 318 and an actuating link 320. The locating link 318 is pivotally mounted at its other end on the axis D and is parallel to the link 314. The actuating link 320 extends from the links 316 and 318 to pivotally connect with a lever 322 itself pivotally mounted on the support frame 80. The lever is attached to one end of a nozzle actuator 324 in the form of a double-acting pneumatic cylinder. The actuator 324 extends between the lever 322 and the support frame 80 and defines two piston chambers 326 and 328 accommodating respective pistons 330 and 332. Movement of one piston from the fully extended position illustrated in FIG. 12a to a retracted position, as shown for example in FIG. 12c, results in a approximately 45° rotation of the lever 322. As the lever 322 is twice as long as the locating link 318, this translates to a approximately 90° rotation of the locating link 318 and a corresponding 90° rotation of the cross member 210 and nozzles 226. Moving the second piston from the extended position to a retracted position, as illustrated in FIG. 12d, results in approximately 22.5° rotation of the lever 322 and the corresponding approximately 45° rotation of the locating link 318 and the nozzles 226.

The pistons 330 and 332 are maintained in the extended configuration by a constant pressure air supply through lines 334 and 336. The air is supplied from the compressor at about 150 p.s.i. and passes through respective pressure reducing valves 338 and 340, which reduce the pressure to about 25 p.s.i., before entering the lines 334 and 336. Retraction of the pistons is activated by singles received from the sensors 256, 258 and 260 and a control unit 342. In the first position as shown in FIG. 12a, and also when the sensor 256 detects the presence of a vehicle, the pistons 330 and 332 remain in the extended position. When the sensor 258 detects the presence of a vehicle a solenoid operated valve 346 is opened to permit air from the compressor to be fed through a pressure reducing valve 344 and reduced to a pressure of approximately 50 p.s.i. to the opposite side of the piston 330. The greater pressure pushes the piston 330 rearwardly, the cylinder dimensions being such that the piston moves to provide a 45° rotation of the lever 322 to rotate the nozzles 226 to be directed in line with the sensor 258. Normally this will occur when the sensor encounters a top or upper surface of the vehicle. It will be noted that, for clarity, details of the air actuation system has been omitted from FIGS. 12b-d.

When the sensor 260 detects a vehicle, the piston 332 is retracted by opening a solenoid operated valve 348 on a further air line 350, from the compressor through a pressure reducing valve 352 to retract the piston 332 to provide a 22.5° rotation of the lever and a corresponding 45° rotation of the nozzles 226 to direct them towards the sensor 260. This will normally occur when a vehicle has passed beneath the follower and the cross member 210 and nozzles 226 are moving down rearward facing surfaces of the vehicle, such as the rear window and possibly the rear surface of the trunk.

When no vehicle is detected by the sensors, and the follower is lowered, the nozzles remain in line with the sensor which has last to detect the presence of the vehicle. Also, after a vehicle has passed beneath the follower 210 and it has been returned to the upright or starting position, the nozzle actuator 324 is automatically reset to rotate the nozzles to point towards the sensor 256, ready to begin washing the front surface of a following vehicle.

The provision of the parallel link assembly ensures that the orientation of the nozzles 226 remains constant as the follower 210 is rotated. The operation of the parallel link depends on the relative positioning of the pivotal links, there being a danger of the assembly locking if the parallelogram formed by the various links collapses. This is most likely to occur when the follower 210 has been pivoted a substantial degree to permit a vehicle pass beneath and while the sensor 256 still detects the presence of the vehicle, as may occur when a van passes through the station 30. To avoid this, a tab 354 is provided on an upper portion of the side member 212 engage the locating link 318 as the collapse of the parallelogram is approached. The tab 354 lifts the link 318 which causes the lever 322 to rotate. The resulting compression of the nozzle actuator is accomodated by movement of the pistons 330 and 332 in the respective cylinders. A similar collapse can occur, for example, when washing the rear doors of vans with the nozzles directed towards the rear sensor 260. To avoid this a second tab 362 is provided adjacent the lower end of the side member 214 for bearing against the crank 314. The tab 362 lifts the crank 314 which causes the lever 322 to rotate. Any resulting compression of the nozzle actuator is accommodated by movement of the pistons 330 and 332 in the chambers 326 and 328.

A somewhat simpler linkage is provided on the other side arm 214 of the follower 210 to maintain the outer pipe 228 and thus the sensors 256, 258 and 260 and safety wheels in the correct orientation. As the orientation of the sensors and safety wheels remain constant throughout the rotation of the follower 210 it is unnecessary to provide any form of actuator, merely a suitable parallel link assembly, fixed relative to the frame 80.

Thus, as a vehicle moves through the station 30, the follower rises and falls, to follow the contours of the upper vehicle surfaces, the nozzles 226 being directed towards the adjacent surface at an angle of attack for maximum cleaning effect.

The cross member 224 is kept further spaced from the vehicle surface by the provision of the relatively long nozzle mounting nipples 236, which permit antenna and the like to pass between the nipples and the member 224 to pass thereover.

Thus it will be seen that the apparatus described above provides for effective frictionless washing of vehicle of a variety of shapes and forms. The use of means to maintain the various nozzles in relatively close proximity to the vehicle surface permits the use of larger angle nozzles with a wider spray arc. Accordingly, fewer nozzles are required and the water requirements of the system are reduced.

It will be clear that the above description is of an exemplary embodiment, and that various changes and modifications, as will be obvious to those skilled in the art, may be made to the example without departing from the scope of invention. The example described is provided on a washing line, where vehicles are pulled passed stationary washing stations. The invention is also applicable for use in roll over vehicle washing systems, in which the vehicle remains stationary while a support frame carrying washing apparatus moves or "rolls" over the vehicle. In such a system it would be likely that the soaking and rinsing arches would also be carried by the frame.

I claim:

1. Apparatus for washing side and end surfaces of a vehicle, in which there is relative movement between the apparatus and the vehicle comprising:

support means;

a side and end follower mounted on the support means to the side of a vehicle path and movable, between a first position to the side of the vehicle and a second position inwardly of the side of the vehicle path;

follower actuating means for moving the follower between the first and second positions;

washing fluid supply nozzles mounted on the follower for directing a spray of washing fluid towards a vehicle on the vehicle path; and nozzle actuating means for moving the nozzles between first and second positions relative to the follower, the nozzles being positioned in the first position when the follower is in the first position, and in the second position when the follower is moving between the first and second positions, when the follower is in the first position, the washing fluid supply nozzles are in the first position to direct fluid inwardly of the vehicle path and thus towards a side surface of a vehicle thereon, and when the follower is moving between the first and second positions, the washing fluid supply nozzles are in the second position to direct fluid along the vehicle path and thus towards an end surface of a vehicle thereon.

2. The apparatus of claim 1, and further comprising first sensor means for detecting the presence of a vehicle on the vehicle path and activating the follower actuating means and nozzle actuating means to move the follower from the first position towards the second position and to move the nozzles from the first position to the second position when the sensor means detects that the rear corner of a vehicle on the vehicle path has passed the follower.

3. The apparatus of claim 1, wherein the first position, the follower is movable to vary the position of the washing fluid supply nozzles relative to the vehicle path and thus vary the distance between said supply nozzles and the side of a vehicle thereon.

4. The apparatus of claim 1, wherein the washing fluid supply nozzles are mounted on an end portion of the follower and the follower is pivotally mounted to the support means for rotation about an upright axis.

5. The apparatus of claim 4, wherein the pivotal mounting between the support means and the follower is spaced from the free end of the follower longitudinally in the direction of relative motion between the support frame and the vehicle wherein, when moving between the first and second positions, the follower may rotate to enable the nozzles to track across an end of the vehicle.

6. The apparatus of claim 5, wherein, in the first position, the follower may be rotated to vary the position of the washing fluid supply nozzles relative to the vehicle path and thus vary the distance between the supply nozzles and the side of a vehicle.

7. The apparatus of claim 6, wherein the follower actuating means includes first follower positioning means for controlling the spacing between the follower and the side of a vehicle on the vehicle track when the follower is in the first position.

8. The apparatus of claim 7, wherein the follower actuating means includes biassing means for biassing the follower towards the second position, the first follower positioning means restraining the follower in the first position until activated by first sensor means to release the follower and permit the follower to move to the second position.

9. The apparatus of claim 8, wherein the first follower positioning means includes second sensor means for continuously determining the position of the side of a vehicle on the vehicle track.

10. The apparatus of claim 9, wherein the second sensor means is in the form of guide means adapted for contacting a side portion of a vehicle on the vehicle track.

11. The apparatus of claim 10, wherein the guide means includes an elongate sidewall engaging member extending substantially parallel to the direction of relative movement between the support frame and the vehicle, the member being biassed inwardly for contacting the sidewall of a tire of a vehicle on the vehicle track.

12. The apparatus of claim 11, wherein the sidewall engaging member is pivotally mounted on two parallel arms, the arms being pivotally mounted to the support means.

13. The apparatus of claim 11, wherein the sidewall engaging member is retractable from a tire contacting position by means of a sidewall engaging member actuator, the actuator being overcome by the biassing means to return to the tire contacting position when the biassing means is activated by third sensor means detecting a vehicle approaching the apparatus.

14. The apparatus of claim 11, wherein first follower positioning means includes latch means mounted on the guide means for restraining the follower in the first position and which latch means may be actuated by the first sensor means to release the follower.

15. The apparatus of claim 14, wherein the latch means is adapted to catch and retain the follower in the first position when the follower returns to the first position.

16. The apparatus of claim 15, wherein the latch means includes a latch member for bearing against the follower, the latch member being biassed to assume an extended position and being movable, on activation by the sensor means, to a first retracted position to release the follower.

17. The apparatus of claim 16, wherein the latch means further includes a lock member for preventing movement of the latch member from the extended position to the first retracted position, the lock member being momentarily movable from a locked position to an unlocked position on activation by the sensor means, to allow movement of the latch member to the first retracted position, and release of the follower.

18. The apparatus of claim 17, wherein on return of the follower to the first position from the second position, the latch member may be deflected from the extended position to a second retracted position to allow passage of the follower, the latch member being biassed to return to the extended position and thereafter retain the follower in the first position.

19. The apparatus of claim 18, wherein the latch member is in the form of counterbalanced plate, pivotally mounted to the guide means.

20. The apparatus of claim 19, wherein the lock member is in the form of plate, smaller than the latch member and pivotally mounted to the guide means and connected to a lock actuator to move the member between the locked and unlocked positions.

21. The apparatus of claim 1, wherein the follower actuator means is in the form of a first fluid operated piston extending between the support means and the follower.

22. The apparatus of claim 21, wherein the first piston also acts as the return means, the piston being adapted for actuation in one direction to act as follower actuator means and for actuation in the other direction to act as return means.

23. The apparatus of claim 22, further comprising a fluid supply for operating the piston via a supply line, the supply line including a restriction to limit the rate of low of fluid to an from the piston and thus limit the rate of rotation of the follower.

24. The apparatus of claim 23, in combination with a vehicle conveyor for moving a vehicle at a predetermined speed along the vehicle path wherein the restriction in the fluid line and the speed of the vehicle conveyor are selected such that when the follower moves from the first position to the second position in the direction of relative movement between a vehicle and the apparatus at a speed substantially equal to said predetermined speed.

25. The apparatus of claim 21, wherein the supply line includes valve means operable to close the line and thus lock the follower relative to the support frame.

26. The apparatus of claim 21, wherein the follower comprises first and second pivotally connected angled arm members fixed in relation to one another by a collapsible member adapted to permit relative rotation of the arm members when a force above a preselected magnitude is applied to the arm members.

27. The apparatus of claim 1, wherein the follower comprises spaced parallel portions extending from the support means and a pipe extending between the free ends of the spaced parallel portions and being rotatably mounted relative thereto, the nozzles being mounted on the pipe and the nozzle actuating means being formed of a fluid operated actuating piston mounted on one of the parallel portions and pivotally connected to crank means fixed to and extending from the pipe.

28. The apparatus of claim 27, further comprising pipe oscillating means provided provided on the follower for oscillating the pipe and thus oscillating the nozzles.

29. The apparatus of claim 28, wherein the pipe oscillating means is located between the piston and the crank means and comprises a rotating motor having a short crank pivotally connected to a connecting link, the connecting link pivotally connected to the crank means, the rotating motor being mounted to the follower through a pivotable mounting, connected to the actuating piston.

30. The apparatus of claim 28, wherein safety wheels are mounted on the followers and extend beyond the nozzles to prevent contact between the nozzles and a vehicle surface in the event of a failure of the guide means.

31. The apparatus of claim 1, and further comprising a second side and end follower provided with respective follower actuating means, washing fluid supply nozzles and nozzle actuating means and movable between a third position to the other side of the vehicle track and fourth position inwardly of said other side of the vehicle track.

32. Apparatus for washing end and upper surfaces of a vehicle in which there is relative movement between the apparatus and the vehicle comprising;
    support means;
    an end and upper follower pivotally mounted on the support means, the pivotal mounting axis extending above and across a vehicle path, and having a cross member for extending across the vehicle path;
    washing fluid supply nozzles mounted on the cross member;
    sensor means mounted on the follower for detecting the presence of a vehicle;
    follower actuating means activated by the sensor means to maintain the cross member a predetermined distance from the vehicle;
    nozzle actuating means mounted on the support means for activation by the sensor means for moving the washing fluid supply nozzles to direct washing fluid towards an adjacent surface of a vehicle;
    first orienting means extending between the nozzles actuating means and the washing fluid supply nozzles for maintaining the orientation of the nozzles as the follower pivots relative to the support means; and
    second orienting means extending between the support means and the sensor means for maintaining the orientation of the sensor means as the follower pivots relative to the support means,
    the follower being movable between a lower first position, where the cross member is positioned in the path of vehicles on the vehicle track for washing an end of a vehicle and a raised second position to permit vehicles to pass therebelow, the sensors detecting the vehicle profile as it moves along the vehicle track relative to the support means and activating the follower actuator means to maintain the washing fluid supply nozzles a predetermined distance from the vehicle.

33. The apparatus of claim 32, wherein the follower includes a pair of spaced side members extending from the follower mounting to the support means and the cross member extends between and is rotatably mounted on said members.

34. The apparatus of claim 33, wherein the cross member is formed of two coaxial parts, an outer part rotatably mounted to the side members for mounting the sensor means, and an inner part, rotatably mounted within the outer part, for mounting the washing fluid supply nozzles.

35. The apparatus of claim 34, wherein the nozzles are provided on elongate extensions extending from the cross member.

36. The apparatus of claim 34, wherein the inner part of the cross member is in the form of a pipe for carrying washing fluid from a fluid supply source to the nozzles, the nozzles being in communication with the interior of the pipe.

37. The apparatus of claim 36, wherein the first orienting means includes a first parallel link assembly, comprising a first crank member pivotally mounted to the support means on the follower mounting axis and maintained in position by the nozzle actuating means, the first crank member being pivotally connected to a firs link extending substantially parallel to a follower side arm, the first elongate link being pivotally connected to a second crank member parallel to and of similar length to the first crank member, and the second crank member being fixed to the inner part of the cross member.

38. The apparatus of claim 37, wherein the second orienting means includes a second parallel link assembly comprising a first crank member fixedly mounted to the support frame and pivotally mounted relative to the follower on the follower mounting axis, the first crank member being pivotally connected to a first elongate link extending parallel to a follower side arm, the first elongate link being pivotally connected to a second crank member parallel to and of similar length to the first crank member, and the second crank member being fixed to the outer part of the cross member.

39. The apparatus of claim 38, wherein safety wheels are mounted on the outer part of the cross member and extend beyond the nozzles to prevent the nozzles contacting a vehicle in the event of apparatus failure.

40. The apparatus of claim 38, wherein the sensor means is in the form of a plurality of sensors, at least one sensor extending rearwardly of the cross member for detecting forwardly directed surfaces of vehicles on the vehicle path, at least one sensor extending downwardly of the cross member for detecting upwardly directed surfaces of vehicles, and at least one sensor extending forwardly of the cross member for detecting rearwardly facing surfaces of vehicles, and the sensor means activating the washing fluid actuating means to direct the nozzles in line with the sensor which detects an adjacent vehicle surface.

41. The apparatus of claim 37, wherein the first elongate link includes nozzle oscillating means.

42. The apparatus of claim 41, wherein the nozzle oscillating means comprises a rotating motor having a short crank pivotally connected to a connecting link, the connecting link pivotally connected to the second crank member, the rotating motor being mounted to a side arm of the follower through a pivotable mounting pivotally connected to the first crank member via an elongate link.

43. Apparatus for washing end and upper surfaces of a vehicle in which there is relative movement between the apparatus and the vehicle comprising;

support means;

an end and upper follower pivotally mounted on the support means and including a cross member for extending across the vehicle path, the pivotal mounting axis extending above and across the vehicle path;

washing fluid supply nozzles mounted on the cross member;

sensor means mounted on the follower for detecting the presence of a vehicle and the location of end and upper surfaces of the vehicle;

follower actuating means activated by the sensor means to maintain the cross member a predetermined distance from the vehicle; and nozzle actuating means for activation by the sensor means for arranging the washing fluid supply nozzles to direct washing fluid towards an adjacent surface of a vehicle, wherein the sensor means is in the form of a plurality of sensors, a sensor extending rearwardly of the cross member for detecting downwardly directed surfaces of vehicles on the vehicle path, a second sensor extending downwardly of the cross member for detecting upwardly directed surfaces of vehicles and a third sensor extending forwardly of the cross member for detecting rearwardly facing surfaces of vehicles and the sensor means activating the nozzle actuating means to direct the nozzles in line with the sensor which detects an adjacent vehicle surface.

44. The apparatus of claim 43, wherein the follower includes a pair of spaced side members extending from the follower mounting to the support means and the cross member extends between and is rotatably mounted on said members.

45. The apparatus of claim 44, wherein the cross member is formed of two coaxial parts, an outer part for mounting the sensor means, and an inner part, rotatably mounted within the outer part, for mounting the washing fluid supply nozzles.

46. The apparatus of claim 45, wherein the nozzles are provided on elongate extensions extending from the cross member.

47. The apparatus of claim 45, wherein the inner part of the cross member is in the form of a pipe for carrying washing fluid from a fluid supply source to the nozzles, the nozzles being in communication with the interior of the pipe.

48. The apparatus of claim 47, and further comprising first orienting means extending between the nozzle actuating means and the washing fluid supply nozzles for maintaining the orientation of the nozzle means as the follower pivots relative to the support means.

49. The apparatus of claim 48, wherein the first orientating means includes a first parallel link assembly, comprising a first crank member pivotally mounted to the support means on the follower mounting axis and maintained in position by the nozzle actuating means, the first crank member being pivotally connected to a first link extending substantially parallel to a follower side arm, the first elongate link being pivotally connected to a second crank member parallel to and of similar length to the first crank member, and the second crank member being fixed to the inner part of the cross member.

50. The apparatus of claim 48, and further comprising second orienting means extending between the support means and the sensor means for maintaining the sensor means orientation as the follower pivots relative to the support means.

* * * * *